(12) United States Patent
Kakutani

(10) Patent No.: US 9,232,080 B2
(45) Date of Patent: Jan. 5, 2016

(54) IMAGE FORMING APPARATUS, CONTROL METHOD FOR THE SAME AND STORAGE MEDIUM

(71) Applicant: CANON KABUSHIKI KAISHA, Tokyo (JP)

(72) Inventor: Naoya Kakutani, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 2 days.

(21) Appl. No.: 14/456,339

(22) Filed: Aug. 11, 2014

(65) Prior Publication Data

US 2015/0062663 A1    Mar. 5, 2015

(30) Foreign Application Priority Data

Aug. 28, 2013   (JP) ................................. 2013-177241

(51) Int. Cl.
*H04N 1/40*   (2006.01)
*H04N 1/00*   (2006.01)

(52) U.S. Cl.
CPC .................................. *H04N 1/00037* (2013.01)

(58) Field of Classification Search
None
See application file for complete search history.

(56) References Cited

U.S. PATENT DOCUMENTS

2006/0053137 A1\* 3/2006 Tanimoto ...................... 707/101
2013/0293929 A1\* 11/2013 Kakutani et al. ............. 358/3.24

FOREIGN PATENT DOCUMENTS

| JP | 2000-185881 | A |   | 7/2000 |              |
|----|-------------|---|---|--------|--------------|
| JP | 2000185881  | A | * | 7/2000 | ... B65H 85/00 |
| JP | 2009225375  | A | * | 10/2009 |             |

\* cited by examiner

*Primary Examiner* — Ashish K Thomas
*Assistant Examiner* — Neil R McLean
(74) *Attorney, Agent, or Firm* — Fitzpatrick, Cella, Harper & Scinto

(57) ABSTRACT

An image forming apparatus reads an original to acquire image information, processes the acquired image information, and determines whether or not to form the processing result on the original. Upon determining to form the processing result on the original, the image forming apparatus forms the processing result on the original, and upon determining to not form the processing result on the original, the image forming apparatus forms the processing result on a sheet other than the original.

12 Claims, 20 Drawing Sheets

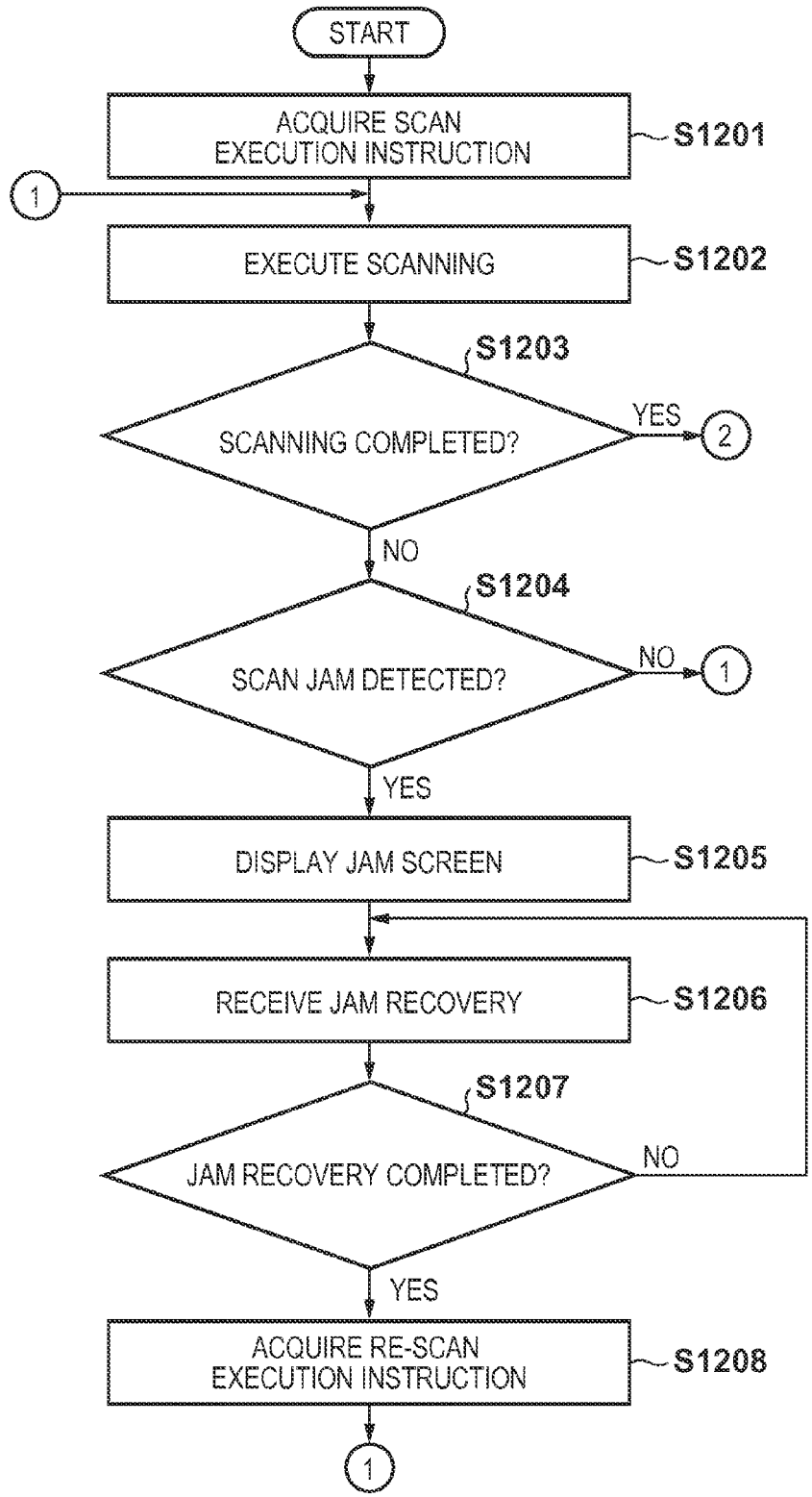

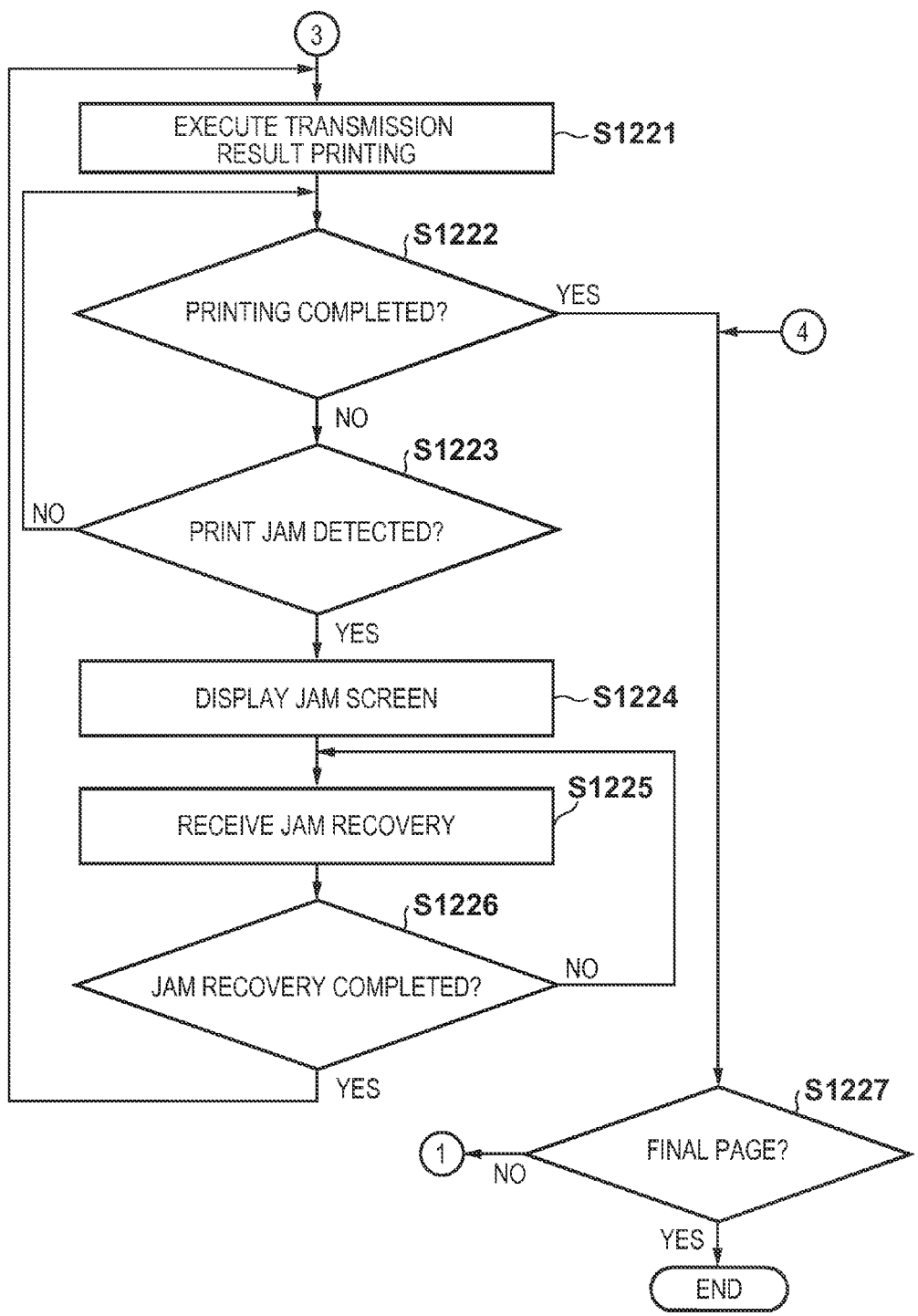

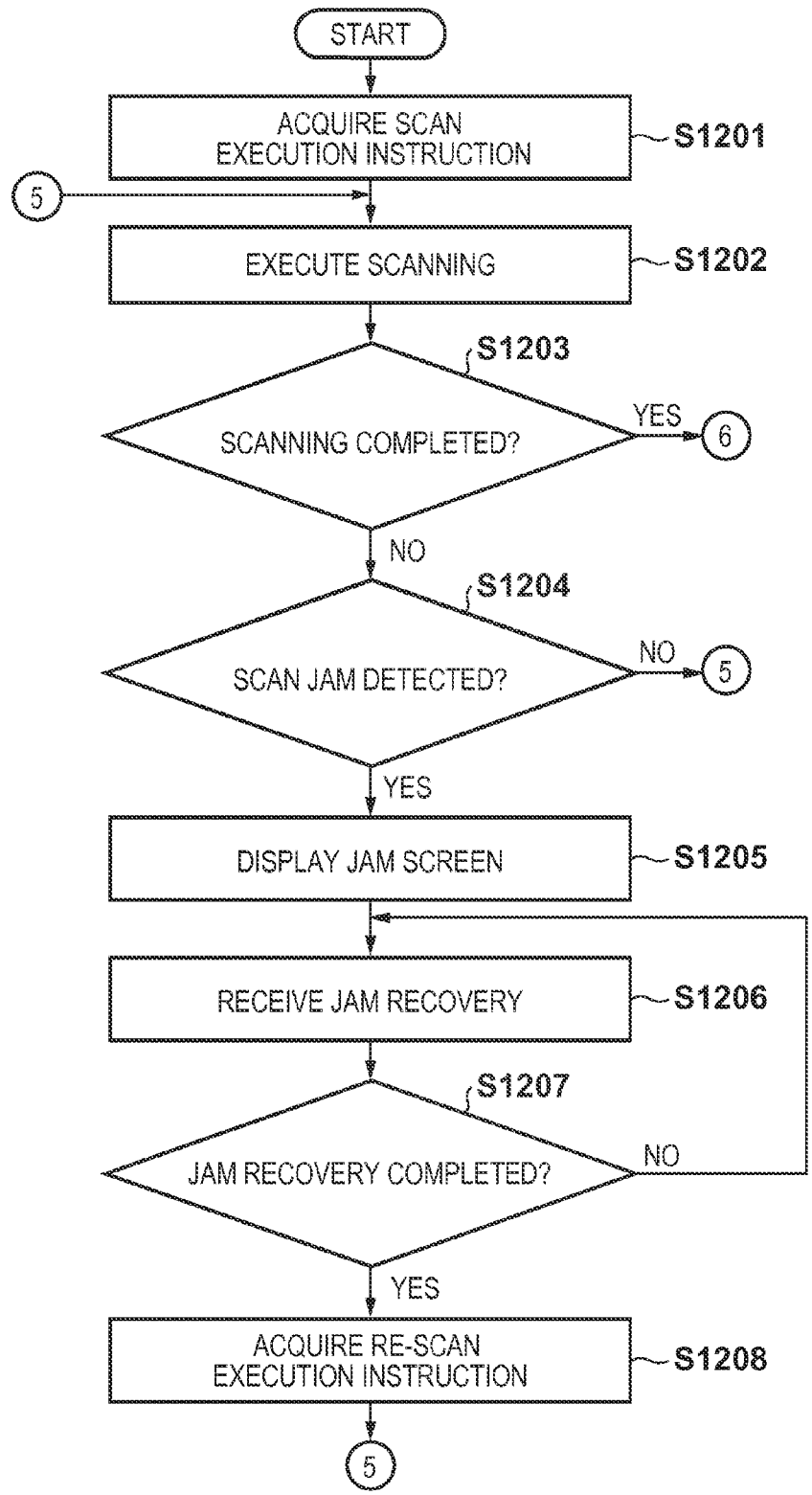

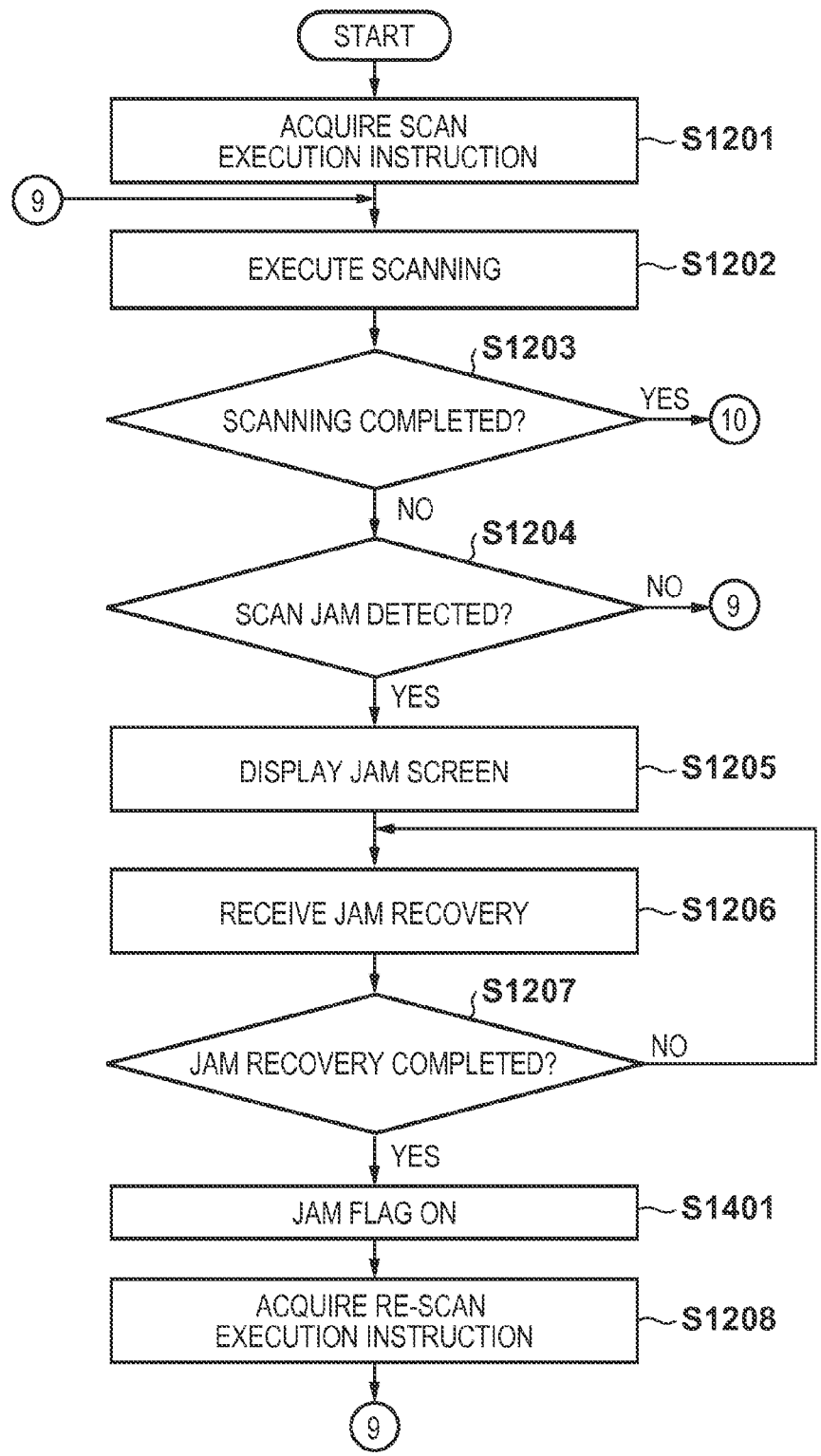

IMAGE FORMING APPARATUS, CONTROL METHOD FOR THE SAME AND STORAGE MEDIUM

BACKGROUND OF THE INVENTION

1. Field of the Invention

The present invention relates to an image forming apparatus for reading and processing an image of an original, a control method for the same, and a storage medium.

2. Description of the Related Art

In existing image forming apparatuses, the original conveying system of an original conveying type of image reading unit and the print sheet conveying system of the print unit for print sheets have generally been configured independently of each other. Specifically, the original conveying system and the print sheet conveying system are each independently provided with a sheet feeding unit for originals or print sheets, guide members that constitute a predetermined conveying path, multiple conveying rollers, a motor that is the drive source, a drive circuit for the motor, a sheet discharge unit, and the like. It has therefore not been possible to avoid an increase in the complexity of the overall functional configuration of the image forming apparatus, a rise in cost, and an increase in apparatus size. Japanese Patent Laid-Open No. 2000-185881 proposes configuration simplification, cost reduction, and size reduction by using the original conveying system and the transfer sheet conveying system in common through providing the image reading unit in the transfer sheet conveying path from the sheet feeding unit to the sheet discharge unit.

With the above-described image forming apparatus, before the print unit performs printing on an original in the sheet feeding stage, the original in that sheet feeding stage is read by the reading unit, and then printing is performed on the original in the sheet feeding stage after the image information of the original has been acquired. Also, some image forming apparatuses such as this have a sheet conveying path and a print unit that can perform printing on an original that has already been subjected to single-sided or double-sided printing. Applications for this include overwrite printing in which printing is performed on an original that has already been subjected to printing. Also, there is a conventionally known function according to which after an image of a read original has been transmitted, the transmission result is printed on a print sheet as a report and discharged. According to this function, the user can view the report in order to check whether or not the image of the original was transmitted normally.

However, the above conventional technology has the problems described below. In the above conventional technology, the transmission result report is printed on a different print sheet from the original. In other words, in the conventional technology, a separate print sheet for report printing needs to be fed and subjected to printing. However, if the read original is an original that is printed on only one side, sheets can be saved by printing the transmission result on the back surface. Accordingly, if the report can be printed on the original, it is desirable to use the original instead of preparing a separate sheet for printing.

SUMMARY OF THE INVENTION

The present invention enables realization of a mechanism in which it is determined whether or not a processing result can be printed on an original, and if it is determined that such printing is possible, the processing result is printed on the original instead of preparing a separate print sheet.

One aspect of the present invention provides an image forming apparatus comprising: a reading unit configured to read an original to acquire image information; a processing unit configured to process the image information acquired by the reading unit; a determination unit configured to determine whether or not a processing result of the processing performed by the processing unit is to be formed on the original; and a forming unit configured to form the processing result on the original if the determination unit has determined that the processing result is to be formed on the original, and to form the processing result on a sheet other than the original if the determination unit has determined that the processing result is not to be formed on the original.

Another aspect of the present invention provides a control method for an image forming apparatus, the control method comprising: reading an original to acquire image information; processing the image information acquired in the reading step; determining whether or not a processing result of the processing performed in the processing step is to be formed on the original; and forming the processing result on the original if it was determined in the determining step that the processing result is to be formed on the original, and forming the processing result on a sheet other than the original if it was determined in the determining step that the processing result is not to be formed on the original.

Further features of the present invention will be apparent from the following description of exemplary embodiments with reference to the attached drawings.

BRIEF DESCRIPTION OF THE DRAWINGS

FIGS. 12A to 12C are flowcharts showing a flow of transmission result printing according to a first embodiment.

FIGS. 13A to 13D are flowcharts showing a flow of transmission result printing according to a second embodiment.

FIGS. 14A to 14D are flowcharts showing a flow of transmission result printing according to a third embodiment.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Image Forming Apparatus Configuration and Processes

The following describes a first embodiment of the present invention with reference to FIGS. 1 to 12. First, the configuration of an image forming apparatus to which the present invention is applied and image formation processes will be described with reference to FIGS. 1 to 7.

Figure 1:
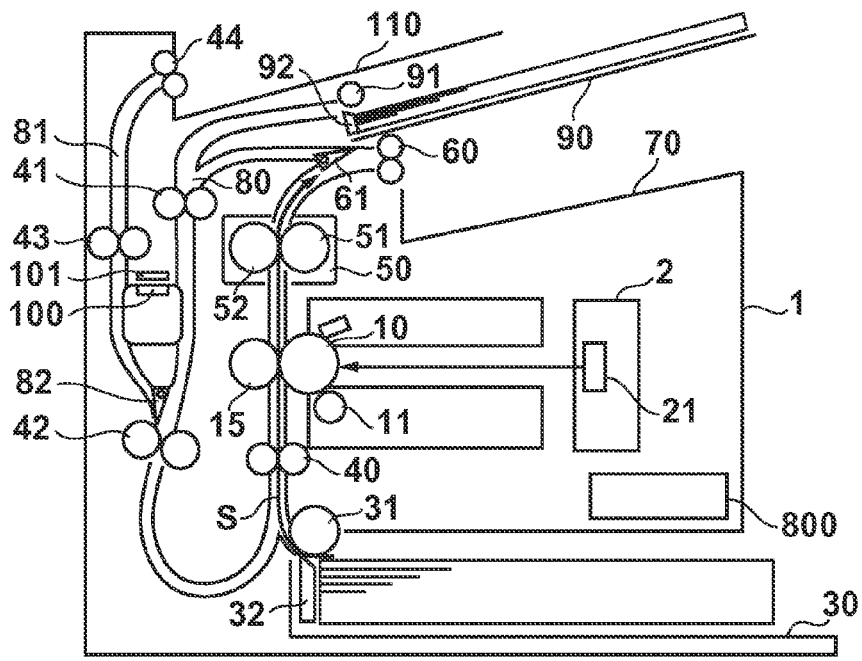
FIG. 1 is a schematic diagram of a multi-functional image forming apparatus.

First, a single-sided printing process will be described with reference to FIG. 1. A rotatable photosensitive drum 10 serving as an image carrier, and a developing roller 11 that is in parallel contact with the photosensitive drum 10 and rotates while holding toner are arranged in the center of an image forming apparatus 1. Upon reception of a print signal, a light emission unit 21 included in an optical unit 2 emits a laser beam on the surface of the rotating photosensitive drum 10. A latent image is formed by the charge on the surface of the photosensitive drum 10 irradiated with the laser beam. As the developing roller 11 rotates, the toner held thereon is supplied to the latent image on the surface of the photosensitive drum 10, and thus a toner image is formed on the surface of the photosensitive drum 10.

Meanwhile, recording materials (also called print paper or sheets) S stored in a first sheet feeding unit 30 are conveyed sheet-by-sheet toward conveying rollers 40 by a CST pickup roller 31 and a separation unit 32. The conveying rollers 40 convey the recording material S to a transfer unit 15 such that the timing of the leading edge position of the toner image on the surface of the photosensitive drum 10 and the timing of the leading edge position of the recording material S match each other. The toner image conveyed to the transfer unit 15 by the rotation of the photosensitive drum 10 is transferred to the recording material S by pressure and an applied bias given to the transfer unit 15.

The transfer unit 15 then conveys the recording material S to a fixing unit 50. In the fixing unit 50, the toner image is fixed to the recording material S through heat from a rotatable heating roller 51 and pressure from a rotatable pressure roller 52 arranged so as to oppose the heating roller 51. The recording material S with the toner image fixed thereon is then conveyed to sheet discharge rollers 60. In the case of single-sided printing, the sheet discharge rollers 60 convey the recording material S to the outside of the apparatus as it is. Accordingly, recording materials S are stacked in a first sheet discharge unit 70. Also, the constituent elements of the image forming apparatus 1 are controlled by an electrical component 800 that will be described later with reference to FIG. 8.

Figure 2:
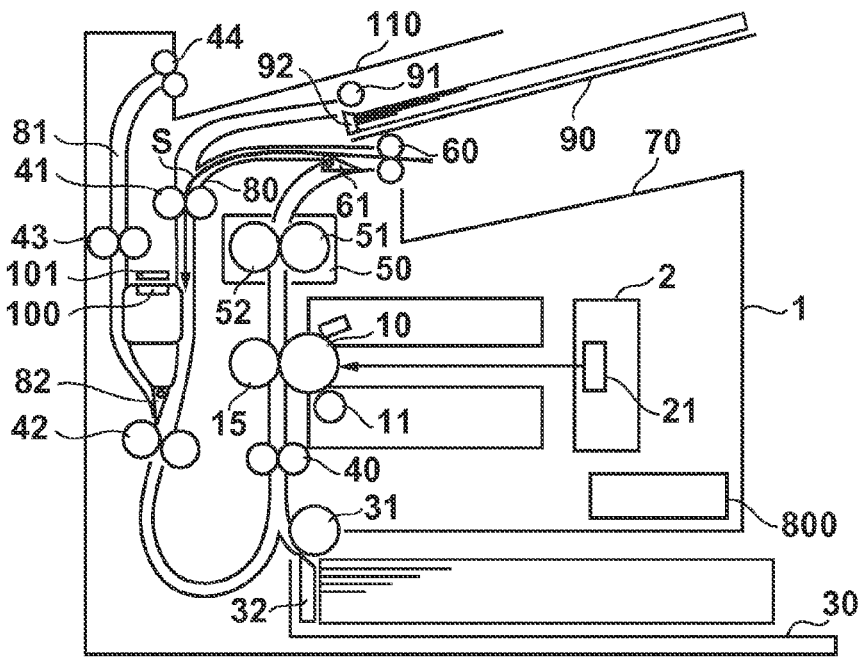
FIG. 2 is a diagram for describing a double-sided printing process.

Next, a double-sided printing process will be described with reference to FIG. 2. The following describes the processes from the operations of the sheet discharge rollers 60 in the single-sided printing process described above. The processes up to that point are similar to the single-sided printing processes, and therefore will not be described. A double-side flapper 61 switches the conveying path after the trailing edge of the recording material S has passed it. In this state, one end portion of the recording material S has been discharged to the first sheet discharge unit 70, but the other end portion is clamped by the sheet discharge rollers 60. Thereafter, the sheet discharge rollers 60 rotate in reverse and convey the recording material S to a double-sided conveying path 80. In other words, the recording material S is conveyed in the direction away from the first sheet discharge unit 70. The switched-back recording material S is then conveyed to an image reading unit 100 via conveying rollers 41. Thereafter, the recording material S is conveyed to conveying rollers 42 and the conveying rollers 40 in the stated order and again conveyed to the transfer unit 15, then a toner image is transferred and fixed to the second surface, which is the back surface relative to the first surface, and then the recording material S is stacked in the first sheet discharge unit 70. Also, the double-sided conveying path 80 is used in common with the conveying path for conveying an original to the image reading unit 100.

Figure 3:
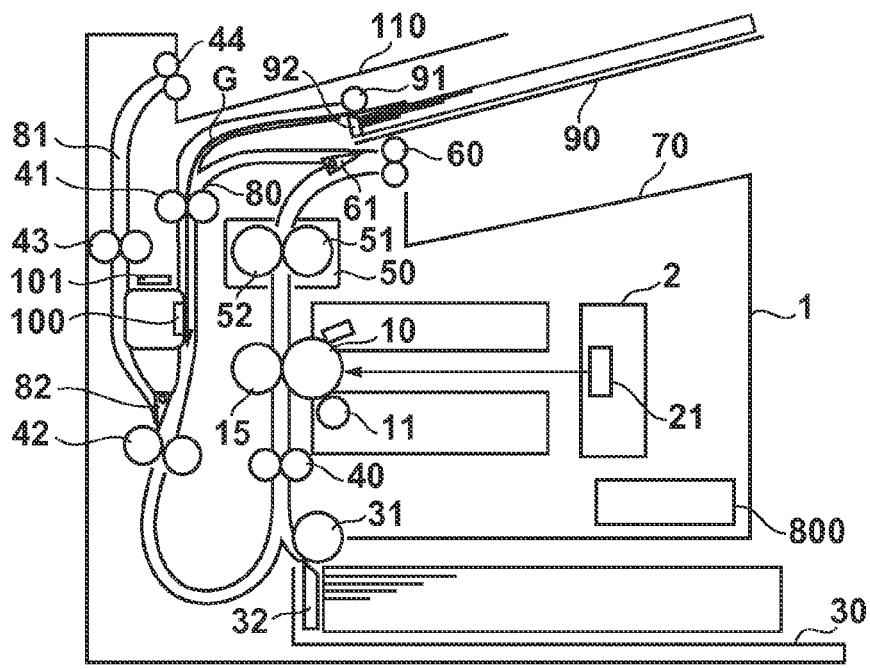
FIG. 3 is a diagram for describing the start of reading the front surface of an original.

Next, processing for reading original information and carrying out double-sided printing on a recording material will be described with reference to FIG. 3. Originals G stored in a second sheet feeding unit 90 are conveyed sheet-by-sheet to the conveying rollers 41 by a CIS pickup roller 91 and a separation unit 92. The image reading unit 100 is provided so as to be movable, irradiates a white reference member 101 and performs white reference value correction before the start of reading the first surface, which is the front surface, of the original G fed from the second sheet feeding unit 90, and then rotates to a position facing the double-sided conveying path 80. Specifically, the image reading unit 100 moves by rotating from the position shown in FIG. 2 to the position shown in FIG. 3, for example. In other words, the image reading unit 100 is provided so as to be movable. The conveying rollers 41 then convey the original G to the image reading unit 100. The image reading unit 100 is already standing by at the position of facing the double-sided conveying path 80, and the information read by the image reading unit 100 is stored as original first surface information in an image memory 804 that will be described later with reference to FIG. 8. Note that the white reference member 101 is arranged facing downward in consideration of preventing the attachment of debris.

Figure 4:
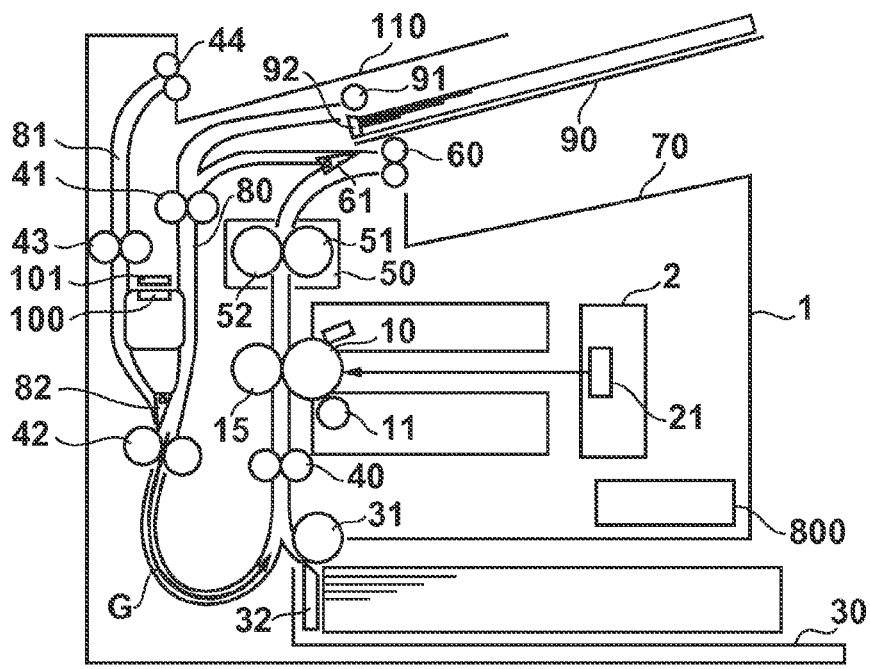
FIG. 4 is a diagram for describing the end of reading a first surface, which is the front surface of an original.

FIG. 4 shows a state at the end of reading the first surface, which is the front surface of the original. The original G that passed the image reading unit 100 is conveyed to the conveying rollers 42. The conveying rollers 42 stop when the trailing edge of the original G has passed a switchback flapper 82. Accordingly, the original G is stopped in the state of being clamped between the conveying rollers 42. After a predetermined time period has elapsed, the original G is conveyed to an original-only conveying path 81, and if reading of the front surface of the original is the only objective, the original G is discharged as is to a second sheet discharge unit 110 as shown in FIG. 6.

Figure 5:
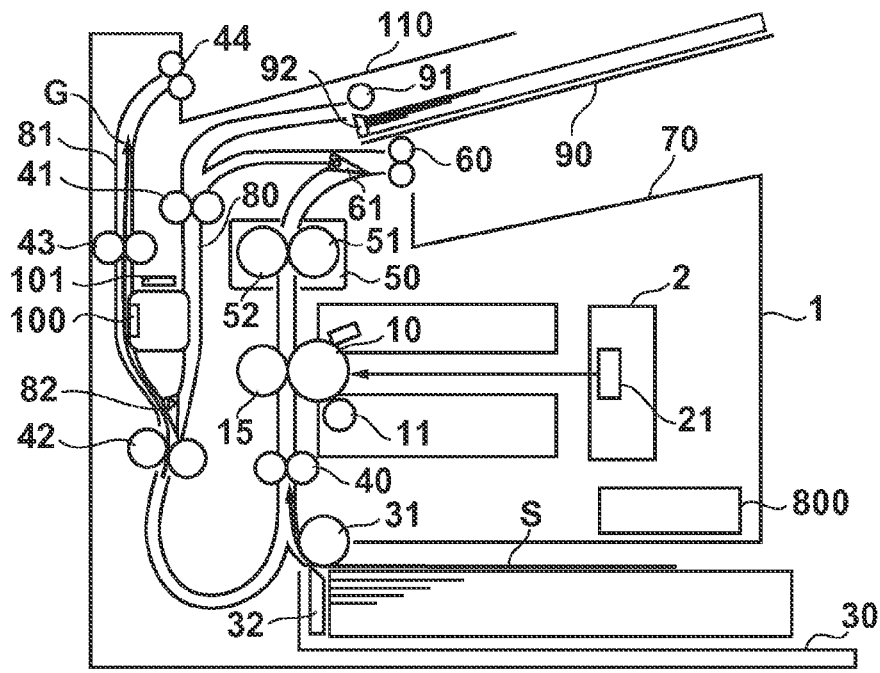
FIG. 5 is a diagram for describing the start of reading a second surface, which is the back surface of an original.

FIG. 5 is a diagram showing the state at the start of reading the second surface, which is the back surface of the original. At the same time as the switchback flapper 82 switches the conveying path from the double-sided conveying path 80 to the original-only conveying path 81, the image reading unit 100 rotates to a position facing the original-only conveying path 81 as shown in FIG. 5. The conveying rollers 42 then rotate in reverse such that the original G is conveyed to the image reading unit 100 along the original-only conveying path 81. When the original G is conveyed to and passes the image reading unit 100, information on the second surface, which is the back surface of the original, is read, and the information on the second surface of the original is stored in the image memory 804.

The following describes operations in which information on both surfaces read from an original are formed on a recording material S. First, the image of the second surface of the original is formed on the recording material S. The recording materials S fed from the first sheet feeding unit 30 are conveyed sheet-by-sheet to the conveying rollers 40. Based on the information on the second surface, which is the back surface of the original, stored in the image memory 804, a latent image that is based on that image information is formed on the photosensitive drum 10 by the light emission unit 21 at substantially the same time. Next, the toner image formed by the latent image is transferred to the recording material S by the transfer unit 15, and then the recording material S is conveyed to the fixing unit 50 and the like, and thus the formation of the image of the second surface of the original is completed. Note that the feeding of the recording material S starts along with the start of the reading of the information on the second surface, which is the back surface of the original, in FIG. 5, but the recording material S may be conveyed after the information on the second surface has been read.

Figure 6:
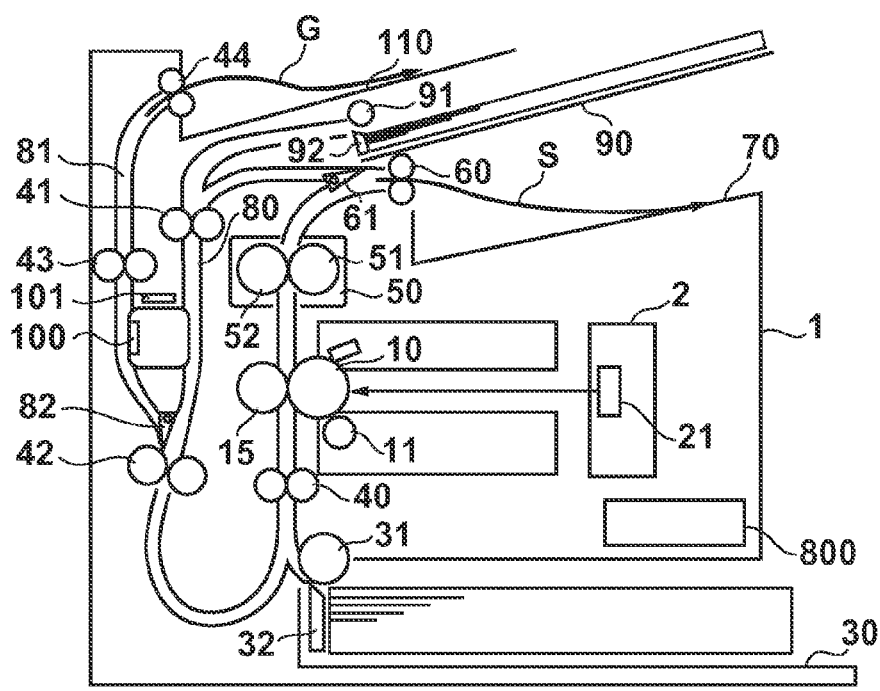
FIG. 6 is a diagram for describing the end of reading the back surface of an original.

FIG. 6 is a diagram showing the state at the end of reading the back surface of the original. After image reading has ended, the original G is conveyed to the conveying rollers 43 and 44, and then stacked in the second sheet discharge unit 110. When the trailing edge of the original G passes the switchback flapper 82, the switchback flapper 82 switches the conveying path from the original-only conveying path 81 to the double-side conveying path 80 such that the recording material S is conveyed toward the conveying rollers 40. After the formation of the image of the second surface of the original on the recording material S is complete, the sheet discharge rollers 60 rotate in reverse such that the recording material S is conveyed toward the double-sided conveying path 80 switched to by the double-side flapper 61.

Figure 7:
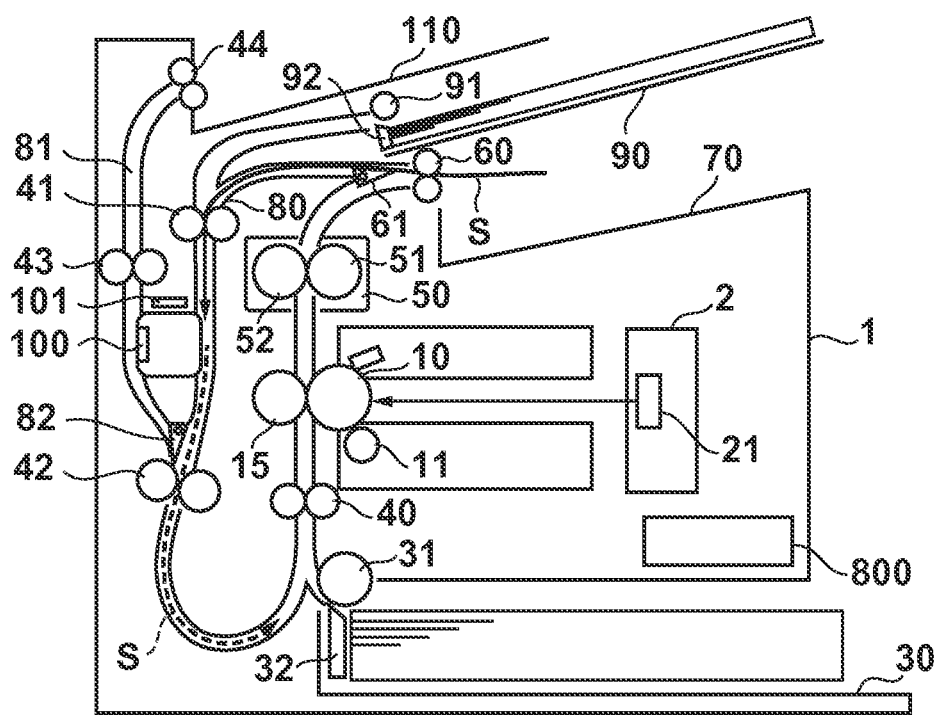
FIG. 7 is a diagram for describing the completion of image formation on a recording material S.

FIG. 7 is a diagram showing the state when image formation on the recording material S is complete. The recording material S conveyed to the double-sided conveying path 80 then passes the inverted image reading unit 100 and is conveyed to the conveying rollers 40 via the conveying rollers 42. The recording material S is then further conveyed to the transfer unit 15 again so as to be at the position of the recording material S shown by broken lines. The formation of the image of the second surface of the original has already ended, and thus the image of the first surface of the original is formed on the recording material S based on the image information on the first surface of the original stored in the image memory 804. Specifically, the recording material S is subjected to toner image transfer and fixing in the image forming unit that includes the optical unit 2, the photosensitive drum 10, the developing roller 11, the transfer unit 15, and the fixing unit 50, and then the recording material S is stacked in the first sheet discharge unit 70.

Control Configuration

Figure 8:
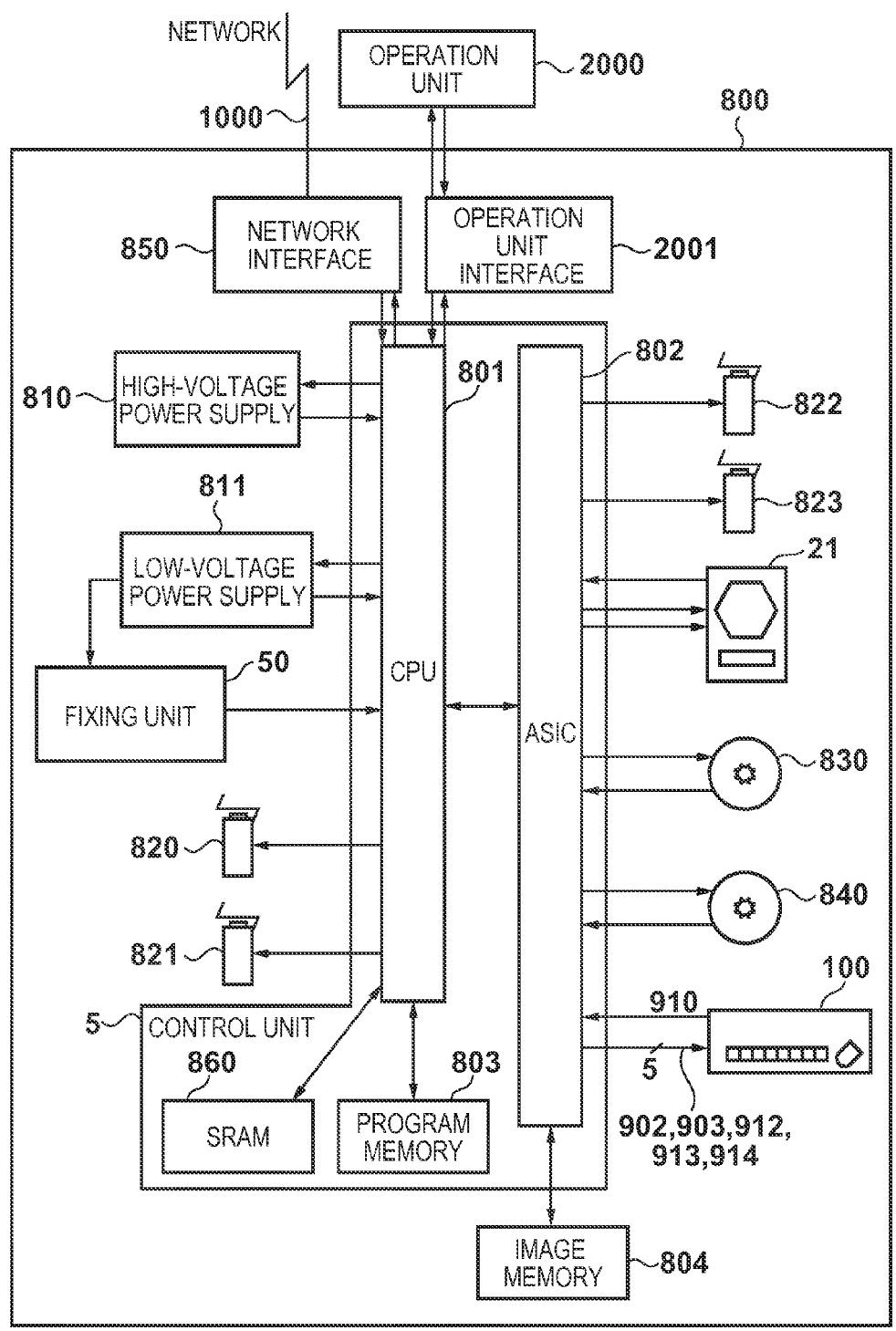
FIG. 8 is a diagram for describing operations of a control unit 5.

Next, the configuration of the electrical component 800, which is centered around a control CPU 801 that is the control unit of the image forming apparatus 1, and operations of the control CPU 801 and an ASIC 802 in image forming operations will be described with reference to FIG. 8. In FIG. 8, the control CPU 801 is connected, via the ASIC 802, to the light emission unit 21 that includes a polygon mirror, a motor, a laser emitting element, and the like. Also, in order to form a desired latent image by scanning a laser beam over the surface of the photosensitive drum 10, the control CPU 801 controls the optical unit 2 by outputting a control signal to the ASIC 802.

The control CPU 801 controls drive systems such as the CST pickup roller 31 and the conveying rollers 40 for conveying recording materials S, as well as the photosensitive drum 10, the transfer unit 15, the heating roller 51, a main motor 830, a CST sheet feeding solenoid 822, a double-side drive motor 840, and the like. The main motor 830 is a motor for driving the pressure roller 52. The CST sheet feeding solenoid 822 switches on at the start of driving of the sheet feeding rollers for feeding recording materials S, and drives the CST pickup roller 31. The double-side drive motor 840 drives the CIS pickup roller 91 and the conveying rollers 41 and 44. Furthermore, the control CPU 801 controls a high-voltage power supply 810, which controls primary charging, developing, primary transfer, and secondary transfer biases that are necessary in the electrophotographic process, as well as the fixing unit 50 and a low-voltage power supply 811. The control CPU 801 furthermore monitors the temperature using a thermistor provided in the fixing unit 50, and performs control for keeping the fixing temperature constant.

Also, the control CPU 801 is connected to a program memory 803 via a bus or the like. The program memory 803 stores data and programs for executing all or some of the processing performed by the control CPU 801 in the above-described control and the later-described embodiments. In other words, the control CPU 801 can execute the operations of the embodiments of the present invention using the programs and data stored in the program memory 803. Note that the program memory 803 also stores temporary calculation results and the like that are necessary when the control CPU 801 performs processing.

The ASIC 802 performs motor speed control in the light emission unit 21 and speed control on the main motor 830 and the double-side drive motor 840 based on instructions from the control CPU 801. In motor speed control, a tach signal from the motor (a signal pulse output from the motor each time the motor rotates) is detected, and an acceleration or deceleration signal is output to the motor such that the tach signal interval is a predetermined time interval. In this way, configuring the control circuit with hardware such as the ASIC 802 has an advantage in that the control burden on the control CPU 801 can be reduced.

Upon receiving a print command given as an instruction from a host computer, the control CPU 801 drives the main motor 830, the double-side drive motor 840, and the CST sheet feeding solenoid 822 so as to convey a recording material S. A toner image formed on the surface of the photosensitive drum 10 is transferred to the recording material S by the transfer unit 15, the toner image is then fixed by the fixing unit 50, and then the recording material S is discharged to the first sheet discharge unit 70 by the sheet discharge rollers 60. In order to improve the alignment of recording materials with images formed thereon, the first sheet discharge unit 70 is provided with a gentle upward inclination in the recording material discharge direction from the vicinity of the discharge opening. Here, the control CPU 801 generates and supplies the recording materials S with a desired amount of heat by supplying a predetermined amount of power to the fixing unit 50 via the low-voltage power supply 811, thus fusing the toner images onto the recording materials S so as to be fixed thereto.

Original Reading Operations

Next, original reading operations in the present embodiment will be described. Upon receiving a scan command given as an instruction from the host computer, the control CPU 801 drives a double-side flapper solenoid 820 and the double-side drive motor 840, and operates a CIS sheet feeding solenoid. Torque from the double-side drive motor 840 is thus transmitted to the CIS pickup roller 91, and the original G can be conveyed. Also, the image reading unit 100 is connected to the ASIC 802 by CISLED, CISSTART, SYSCLK, S1_in, S1_select, and S1_out, which are various types of control signals that will be described later. The control CPU 801 performs various types of control via the ASIC 802 so as to store the image read by the image reading unit 100 in the image memory 804 connected to the ASIC 802. Thereafter, the control CPU 801 operates a switchback solenoid 821 so as to switch the switchback flapper 82 to the original-only conveying path side, inverts the double-side drive motor 840, and conveys the original G to the second sheet discharge unit 110.

Communication Operations

Next, communication operations in the present embodiment will be described. The control CPU 801 inputs and outputs image information and device information through being connected to a network 1000 via a network interface 850. An instruction input from an operation unit 2000 is received by the control CPU 801 from an operation unit interface 2001, and the control CPU 801 makes a determination regarding the content of the instruction. In the present embodiment, the operation unit 2000 is envisioned to be a local UI configured by a display unit that includes a touch panel type of liquid crystal screen, but there are no particular limitations, and a button selection type of local UI or a remote UI over the previously-mentioned network 1000 may be used.

Configuration of Original Reading Unit

Figure 9:
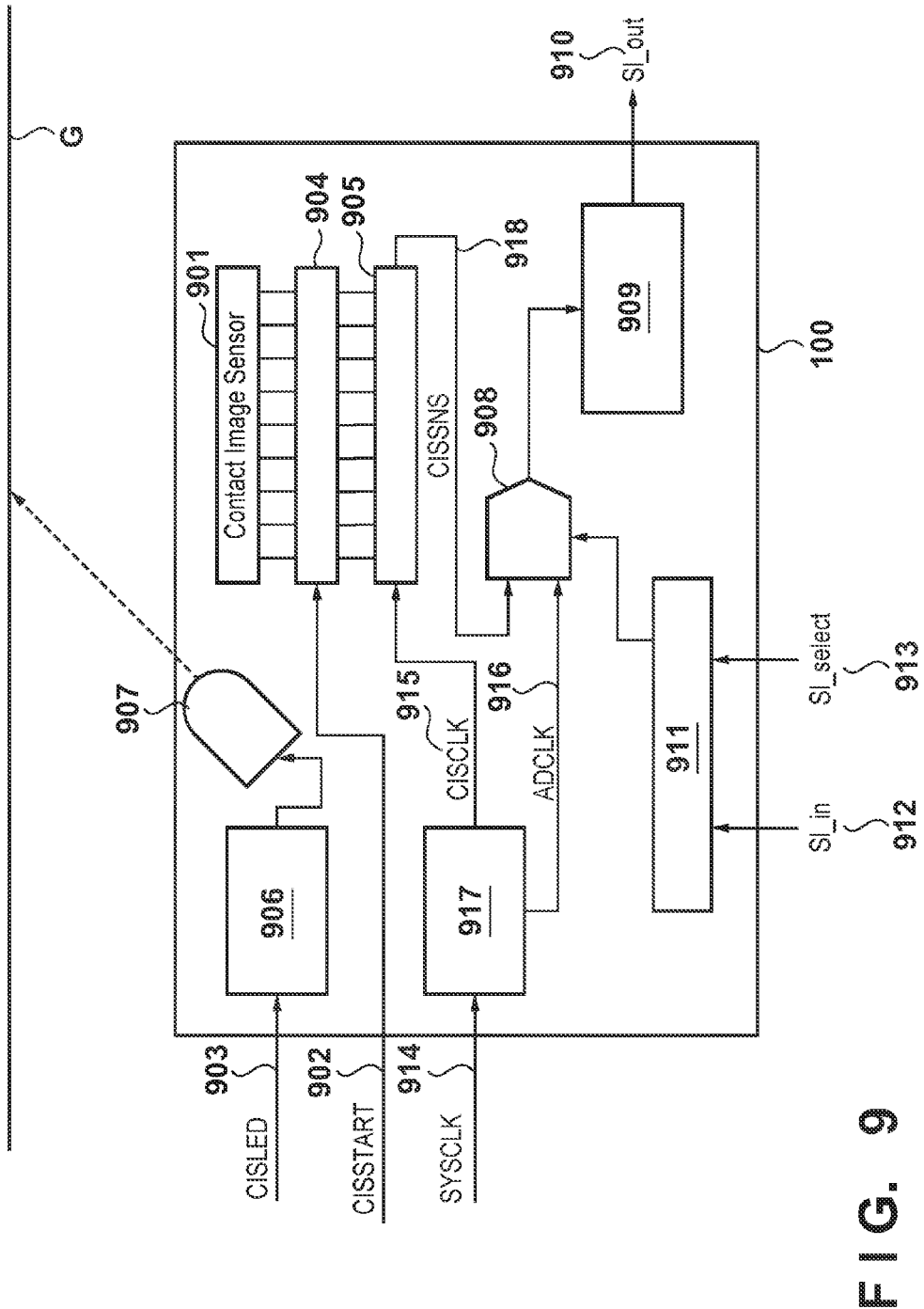
FIG. 9 is a diagram for describing a configuration of an image reading unit.

Next, the configuration of the image reading unit 100 will be described in detail with reference to FIG. 9. FIG. 9 is a circuit block diagram of a CIS (Contact Image Sensor). As shown in FIG. 9, 901 indicates a contact image sensor unit in which, for example, 10368 pixels worth of photodiodes are arranged in an array with a specific main scanning density (e.g., 1200 dpi). Also, 902 and 915 respectively indicate a start pulse CISSTART signal and a transfer clock CISCLK that are given to the CIS sensor unit 901. Furthermore, 914 indicates a system clock SYSCLK that determines the operation speed of the CIS sensor unit. Furthermore, 908 indicates an A/D converter. Furthermore, 916 indicates a CIS sampling clock ADCLK that determines the sampling speed of the A/D converter. Furthermore, 917 indicates a timing generator. Furthermore, 904 indicates an output buffer. Furthermore, 905 indicates a shift register. Furthermore, 903 indicates a light emitting device control signal. Furthermore, 906 indicates a current amplification unit. Furthermore, 907 indicates a light emitting device that uniformly irradiates the original G.

The following describes operations. When the CISSTART signal 902 is activated, the CIS sensor unit 901 starts accumulating charge based on the received light, and successively sets data in the output buffer 904. Next, when the transfer clock CISCLK 915 (e.g., approximately 500 kHz to 1 MHz) is received, the data set in the output buffer 904 is transferred to the A/D converter 908 by the shift register 905 as a CISSNS signal 918. Since the CISSNS signal 918 has a predetermined data assurance region, it needs to be sampled after the elapse of a predetermined amount of time from the timing of the rise in the transfer clock CISCLK 915. Also, the CISSNS signal 918 is output in synchronization with both the rising and falling edges of the transfer clock CISCLK 915. Accordingly, the CIS sampling clock ADCLK 916 is generated so as to have a frequency that is twice that of the transfer clock CISCLK 915, and the CISSNS signal 918 is sampled at the rising edge of the CIS sampling clock ADCLK 916. The timing generator 917 generates the CIS sampling clock ADCLK 916 and the transfer clock CISCLK 915 by dividing the system clock SYSCLK 914. The phase of the CIS sampling clock ADCLK 916 is delayed relative to the transfer clock CISCLK 915 by an amount corresponding to the data assurance region.

After being subjected to digital conversion by the A/D converter 908, the CISSNS signal 918 is output as serial data in the S1_out signal 910 under predetermined timing control performed by an output interface circuit 909. At this time, an analog output reference voltage is output in the CISSNS signal 918 corresponding to a predetermined number of pixels from the start pulse CISSTART 902, and this portion cannot be used as effective pixels. However, the A/D conversion gain of the A/D converter 908 can be variably controlled by a control circuit 911 according to an S1_in signal 912 and an S1_select signal 913. For example, if the contrast of the captured video is insufficient, the control CPU 801 increases the contrast by increasing the A/D conversion gain of the A/D converter 908, thus being able to always capture video with optimal contrast.

Although the above describes a system in which all of the pixels are output as the one output signal CISSNS signal 918, pixels for high-speed reading may be divided into respective areas, and A/D conversion may be performed on multiple areas at the same time. Also, although a CIS sensor is used in the image reading unit 100 in the above description, it may be substituted with a CMOS sensor, a CCD sensor, or the like.

Transmission Result Printing Control

Next, transmission processing in the present embodiment for transmitting the image information acquired from the original by the image forming apparatus 1 to an external apparatus, and control for performing transmission result printing will be described with reference to FIGS. 10A to 12C. Although the following description takes the example of transmission processing as image information processing, the present invention is not limited to this, and the present invention can also be applied to, for example, control for executing processing in which an image acquired from an original is printed or transmitted by facsimile, and then printing the results of that processing. The processing described below is controlled by the control unit 5 of the image forming apparatus 1. Here, the control unit 5 is configured by the control CPU 801, the ASIC 802, the program memory 803, and an SRAM 860 of the image forming apparatus 1. The processing described below is stored as a program in a storage unit of the control unit 5, namely the program memory 803 or the SRAM 860, and is executed by the control CPU 801 in accordance with the stored program.

Figure 10A:
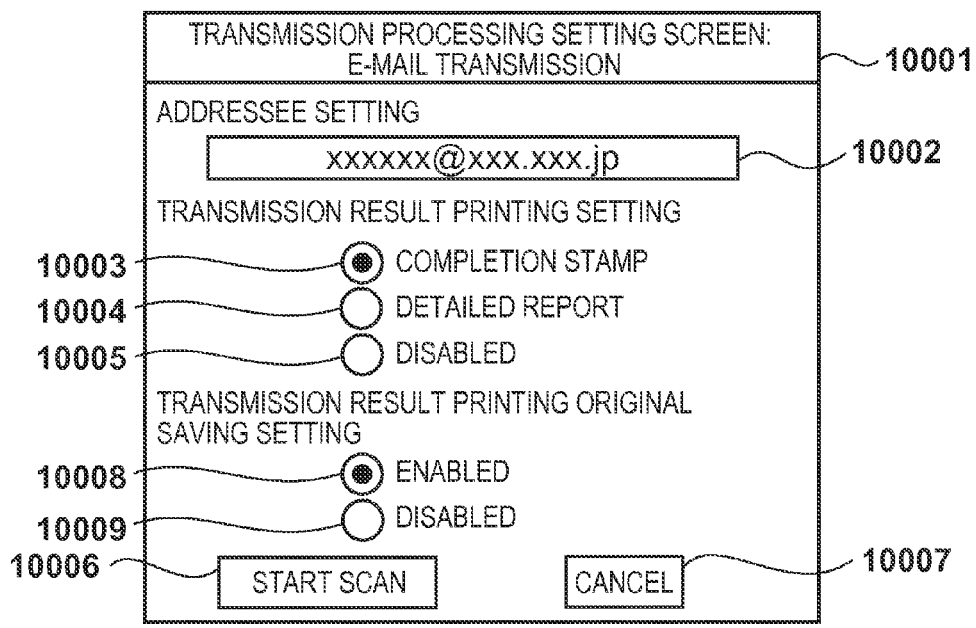
FIGS. 10A to 10C are diagrams showing a transmission processing setting screen according to an embodiment.

A transmission processing setting screen 10001 of the present embodiment shown in FIG. 10A receives input and settings from the operation unit 2000. According to the present embodiment, it is assumed that the image forming apparatus 1 transmits E-mail to an external apparatus as the transmission processing. This is processing in which the image forming apparatus 1 converts a scanned image into image data in the PDF or Tiff format, and transmits the image data to an address designated with SMTP (Simple Mail Transfer Protocol) or the like. Note that although the use of E-mail transmission is given as an example of a function that requires transmission result printing to be performed in the present embodiment, there is no limitation to this, and the present invention is also applicable to transmission functions such as FAX and I-FAX transmission. In the present embodiment, an E-mail transmission destination address is set in an addressee setting text box 10002 in the transmission processing setting screen 10001. Also, in the present embodiment, the image forming apparatus 1 can print two types of results, namely a completion stamp or a detailed report, as types of transmission result printing functions.

Figure 11:
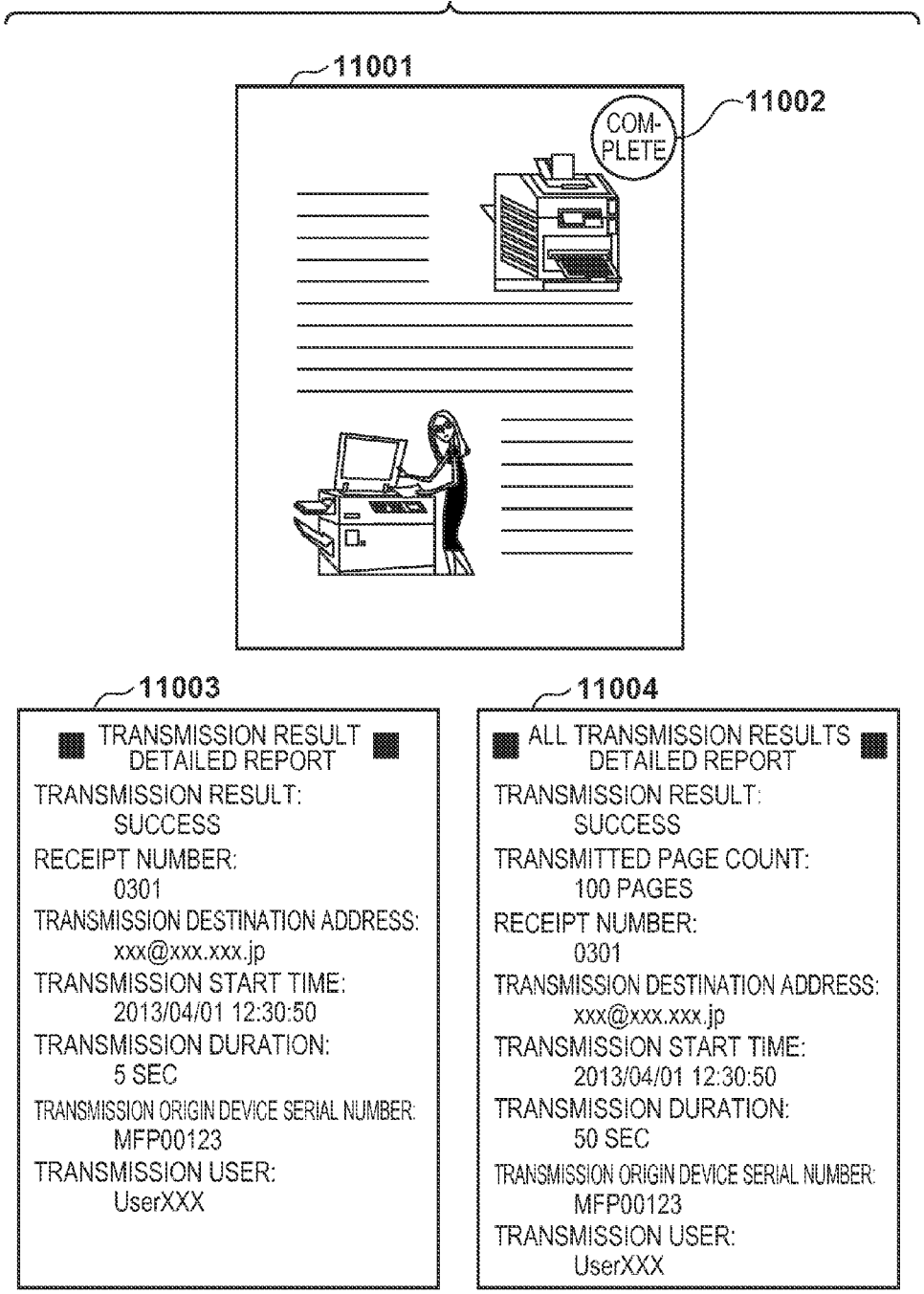
FIG. 11 is a diagram showing an example of an original that has been subjected to transmission result printing according to an embodiment.

In FIG. 11, 11001 indicates an original on which a completion stamp mark 11002 has been printed. This completion stamp is a simple representation of the transmission result, is used to leave evidence of the fact that the image forming apparatus 1 transmitted that original, and is printed in a relatively small region on the original that was scanned. Although the completion stamp in the present embodiment is the printed mark "Complete", it may be a representation with another mark, or it may include the printed date/time, and there are no limitations on the completion stamp mark. Furthermore, since the completion stamp mark is a relatively small mark, in order to make the completion stamp mark more noticeable to the user in the present embodiment, it is printed on the surface of the scanned original that has the original image. The present invention is not intended to be limited to this, and the completion stamp mark may be printed on the back surface that does not have the original image.

In FIG. 11, 11003 indicates a transmission result detailed report original. The detailed report in the present embodiment is a detailed form of the transmission result, and is a printed report including a transmission result, a receipt number, a transmission address, a transmission start time, a transmission duration, a transmission origin device serial number, and a transmission user, for example. Note that this is merely one example, and the present invention is not limited to this. In the present embodiment, the detailed report is printed on a blank surface (e.g., the back surface of the original) since there is a large amount of printed content. However, normally it is often printed on a blank original other than the scanned original.

The type of transmission result printing function can be set using a completion stamp setting button 10003 and a detailed report setting button 10004 in the transmission processing setting screen 10001. If a disable transmission result printing setting button 10005 is selected, the transmission result printing function is disabled. Any one of these settings is set, and multiple buttons cannot be selected at the same time. In the present embodiment, the settings of the completion stamp setting button 10003, the detailed report setting button 10004, and the disable transmission result printing setting button 10005 are collectively called the transmission result printing setting. The transmission processing setting screen 10001 is an example of a screen in which the completion stamp setting button 10003 has been selected and is enabled.

When a start scan button 10006 is pressed from the operation unit 2000, the image forming apparatus 1 executes original scanning and E-mail transmission, and executes transmission result printing if the transmission result printing function setting is enabled. Here, the image forming apparatus 1 of the present embodiment has a saving function in transmission result printing as a transmission result printing function. The saving function in transmission result printing is a function in which, in the case of performing transmission result printing on a blank surface such as the case of printing a detailed report, if the scanned original is an original that is printed on only one side, the transmission result is printed on the blank back surface of the scanned original instead of on a different sheet from the scanned original. Note that if the scanned original has already been printed on both sides, a separate sheet is used. In other words, with this function, instead of using a separate sheet for a detailed report, it is possible to suppress the consumption of sheets when performing transmission result printing in the case of a detailed report. Also, the determination of whether the scanned original has been printed on one side or both sides may be made based on whether single-sided scanning or double-sided scanning was performed, for example. Alternatively, this determination may be made based on user input, or the determination of whether or not something is printed may be made using a sensor provided in the apparatus. The saving function is enabled if an enable saving function button 10008 in the transmission processing setting screen 10001 is selected, and is disabled if a disable saving function button 10008 is selected. These settings are collectively called the saving setting in the present embodiment. The saving setting cannot be selected from the operation unit 2000 unless the transmission result printing setting is enabled, that is to say, unless either the button 1003 or the button 1004 has been set. These setting values that are input and referenced in the transmission processing setting screen 10001 are acquired from and stored in the SRAM 860 in the control unit 5.

Figure 12B:
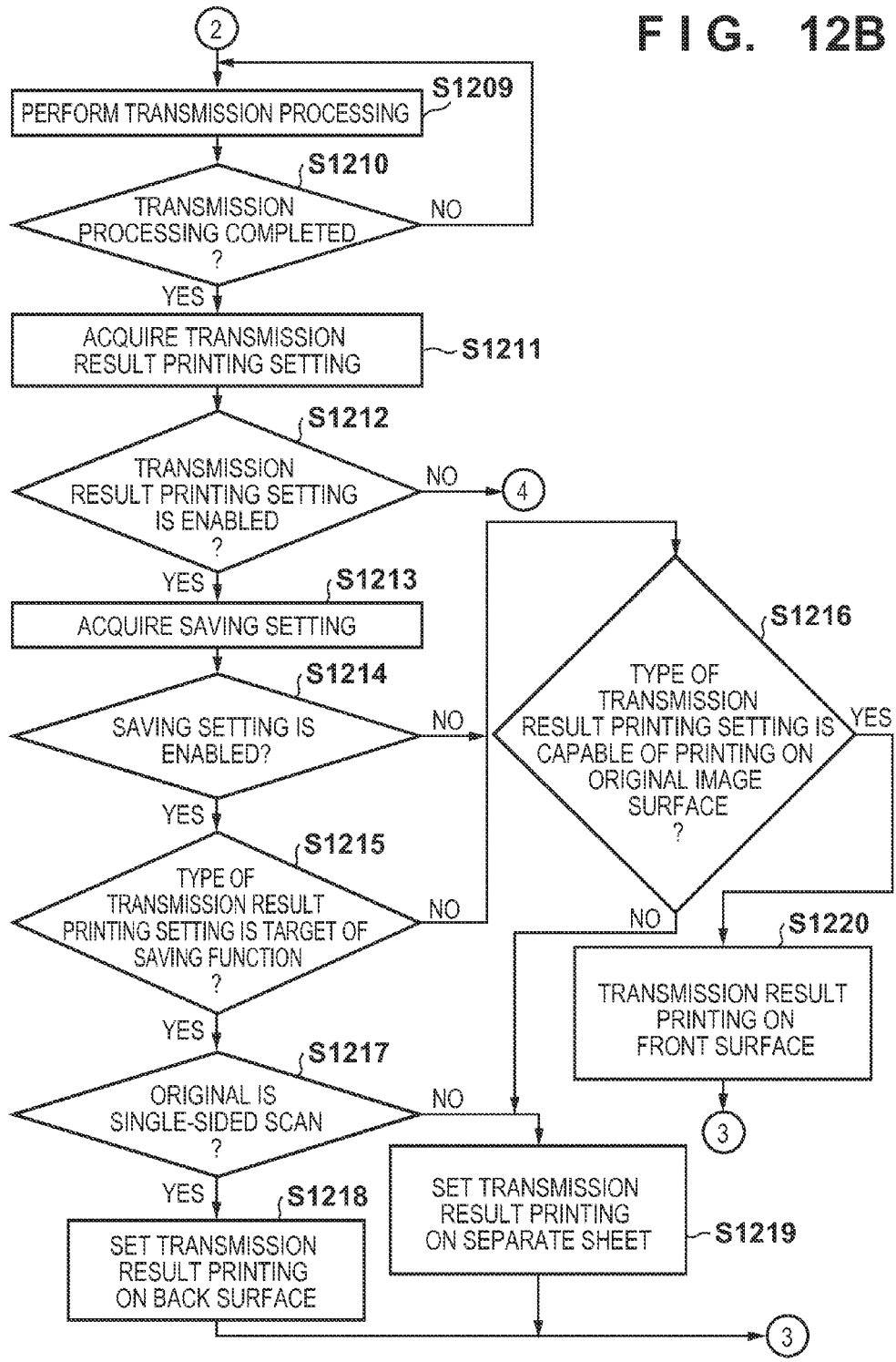

In FIGS. 12A to 12C, S1201 to S1227 indicate a flow of processing in which the image forming apparatus 1 scans an original, performs transmission processing, and performs transmission result printing. In the following processing, the original that is to be subjected to transmission processing is placed in the second sheet feeding unit 90 of the image forming apparatus 1, subjected to scan and transmission processing, and then subjected to transmission result printing.

In step S1201, the control unit 5 detects that the start scan button 10006 was pressed via the operation unit 2000, and acquires a scan start instruction. Note that scanning-related settings such as the scanned original size, single-sided or double-sided scanning, the scanning color mode, and the resolution are set from the operation unit 2000 in advance in a scan setting screen. These settings are collectively called the scan settings in the present embodiment. The control unit 5 stores the scan settings in the SRAM 860.

Next, in step S1202, in accordance with the scan settings acquired from the SRAM 860, the control unit 5 feeds an original stored in the second sheet feeding unit 90 to the double-sided conveying path 80, and executes reading on the printed surface with the image reading unit 100. Image information of the original read at this time is held in the image memory 804 and managed by the control unit 5.

In step S1203, the control unit 5 determines whether or not scanning is complete. If it is determined that scanning is not complete, the procedure moves to step S1204, and the control unit 5 determines whether or not a scan jam has been detected. The procedure returns to step S1202 if a scan jam has not occurred, whereas the procedure moves to step S1205 if a scan jam has occurred.

In step S1205, the control unit 5 displays a notification on the operation unit 2000 to the effect that a scan jam was detected. Next, in step S1206, the control unit 5 receives a jam recovery for removing the jammed original in the image forming apparatus 1. When the jam recovery has been received, in step S1207, the control unit 5 determines whether or not the jam recovery is complete. If the jam recovery has been received, and it was determined that the jam recovery is complete, the procedure moves to step S1208. In step S1208, since it was determined that the jam recovery is complete, the control unit 5 returns to step S1202, receives a re-scan execution instruction from the operation unit 2000, acquires the re-scan execution instruction, and executes scanning again.

On the other hand, if it is determined in step S1203 that scanning is complete, the procedure moves to step S1209, and the control unit 5 performs transmission processing. In the transmission processing of the present embodiment, the control unit 5 converts original image information held in the image memory 804 into the PDF format, and performs E-mail transmission with SMTP. In step S1210, the control unit 5 determines whether or not transmission processing is complete. If it is complete, the procedure moves to step S1211, in which the control unit 5 acquires the transmission result printing setting from the SRAM 860.

Next, in step S1212, the control unit 5 determines whether or not the transmission result printing setting acquired from the SRAM 860 is enabled, that is to say, whether or not the completion stamp setting button 10003 or the detailed report setting button 10004 is enabled. Here, the procedure moves to step S1227 if the transmission result printing setting acquired from the SRAM 860 is disabled. Specifically, the image forming apparatus 1 executes only transmission processing on the scanned original, and does not execute transmission result printing.

On the other hand, if it was determined in step S1212 that the transmission result printing setting is enabled, the procedure moves to step S1213, in which the control unit 5 acquires the transmission result printing saving setting from the SRAM 860. Next, in step S1214, the control unit 5 determines whether or not the saving setting acquired from the SRAM 860 is enabled. Here, if the saving setting acquired from the SRAM 860 is enabled, the procedure moves to step S1215, in which the control unit 5 determines whether or not the type of transmission result printing setting that was acquired is a target of the saving function. In the present embodiment, the saving function is applied if the type of transmission result printing setting is the detailed report. On the other hand, if the type of the transmission result printing setting is the completion stamp, printing will be performed on the surface of the scanned original that has the original image, and therefore the saving function will not be applied.

If it was determined in step S1214 that the saving setting is disabled, the procedure moves to step S1216. If it was determined in step S1215 that the type of transmission result printing setting is not a target of the saving function, that is to say, if the completion stamp setting was selected, the procedure moves to step S1216.

If it was determined in step S1215 that the type of transmission result printing setting is a target of the saving function, that is to say, if the detailed report setting was selected, the procedure moves to step S1217, in which the control unit 5 determines whether or not the scan setting is single-sided scanning. If it is determined that the scan setting is single-sided scanning, the procedure moves to step S1218, in which the control unit 5 sets the printing of the detailed report transmission result on the back surface of the scanned original, and thereafter the procedure moves to step S1221, in which transmission result printing is executed. On the other hand, if it is determined in step S1217 that the scan setting is double-sided scanning instead of single-sided scanning, the procedure moves to step S1219, in which the control unit 5 sets the printing of the detailed report transmission result on a separate sheet from the first sheet feeding unit 30, and thereafter the procedure moves to step S1221, in which transmission result printing is executed. In this way, if the saving setting is enabled, a determination is made regarding the type of transmission result printing, and if the type is transmission result printing for printing on a separate sheet, print sheets can be saved by performing printing on the back surface of the scanned original instead of on a separate sheet.

In step S1216, the control unit 5 determines whether or not the transmission result printing setting is a type in which printing can be performed on the surface of the scanned original that has the original image. In the present embodiment, if the transmission result printing setting is the completion stamp setting, printing can be performed on the surface of the scanned original that has the original image. Also, as previously described, if the transmission result printing setting is the detailed report setting, printing cannot be performed on the surface of the scanned original that has the original image. Here, if the transmission result printing setting is not the type in which printing can be performed on the side that has the original image, that is to say, if the transmission result printing setting is the detailed report setting, the procedure moves to step S1219, in which the control unit 5 sets transmission result printing for printing on a separate sheet in the first sheet feeding unit 30, and thereafter the procedure moves to step S1221, in which transmission result printing processing is executed. On the other hand, if the transmission result printing setting is the type in which printing can be performed on the surface that has the original image, that is to say, if the transmission result printing setting is the completion stamp setting, the procedure moves to step S1220, in which the control unit 5 sets transmission result printing for printing on the front surface of the scanned original, and thereafter the procedure moves to step S1221, in which transmission result printing is executed.

In step S1222, the control unit 5 determines whether or not printing is complete. Here, if it is determined that printing is not complete, the procedure moves to step S1223, and the control unit 5 determines whether or not a print jam has been detected. If a print jam has been detected, the procedure moves to step S1224, in which the control unit 5 displays a notification on the operation unit 2000 to the effect that a print jam was detected. Next, in step S1225, the control unit 5 receives a jam recovery for removing the jammed original in the image forming apparatus 1. Then, in step S1226, the control unit 5 determines whether or not the jam recovery is complete, that is to say, whether or not the cause of the jam was resolved. If the jam recovery is not complete, the jam recovery is received again in step S1225. If the control unit 5 determined in step S1226 that the jam recovery is complete, the procedure moves to step S1221, in which transmission result printing is executed again.

On the other hand, if it was determined in step S1222 that a print jam has not been detected, the procedure moves to step S1227, in which the control unit 5 determines whether or not the scanned original is the final page. If the scanned original is not the final page, the procedure returns to step S1202 in order to execute scanning on the next original. On the other hand, if the scanned original is the final page, the control unit 5 ends this processing.

As described above, according to the present embodiment, when the image forming apparatus 1 performs transmission result printing, control is performed for switching the sheet and position (surface) where transmission result printing is performed according to the saving setting and the type of transmission result printing. Specifically, in the case where the saving setting is enabled and the type of transmission result printing setting is the completion stamp setting, the image forming apparatus 1 of the present embodiment forms the completion stamp on the front surface of the original that was subjected to image reading. Also, in the case where the saving setting is enabled, and the type of transmission result printing setting is the detailed report setting, if the original that was subjected to image reading is printed on only one side, the image forming apparatus 1 forms the detailed report on the back surface of that original, and if it is printed on both sides, the detailed report is printed on a separate sheet. Also, if the saving setting is disabled, the image forming apparatus 1 forms the completion stamp on the front surface of the original in the case of the completion stamp setting, and forms the detailed report on a separate sheet in the case of the detailed report setting. According to the control described above, in the case of the type for performing transmission result printing on a separate sheet, if a predetermined condition is satisfied, the transmission result detailed report is printed on the back surface of the scanned original instead of on a separate sheet, thus making it possible to save print sheets.

Second Embodiment

Figure 13B:
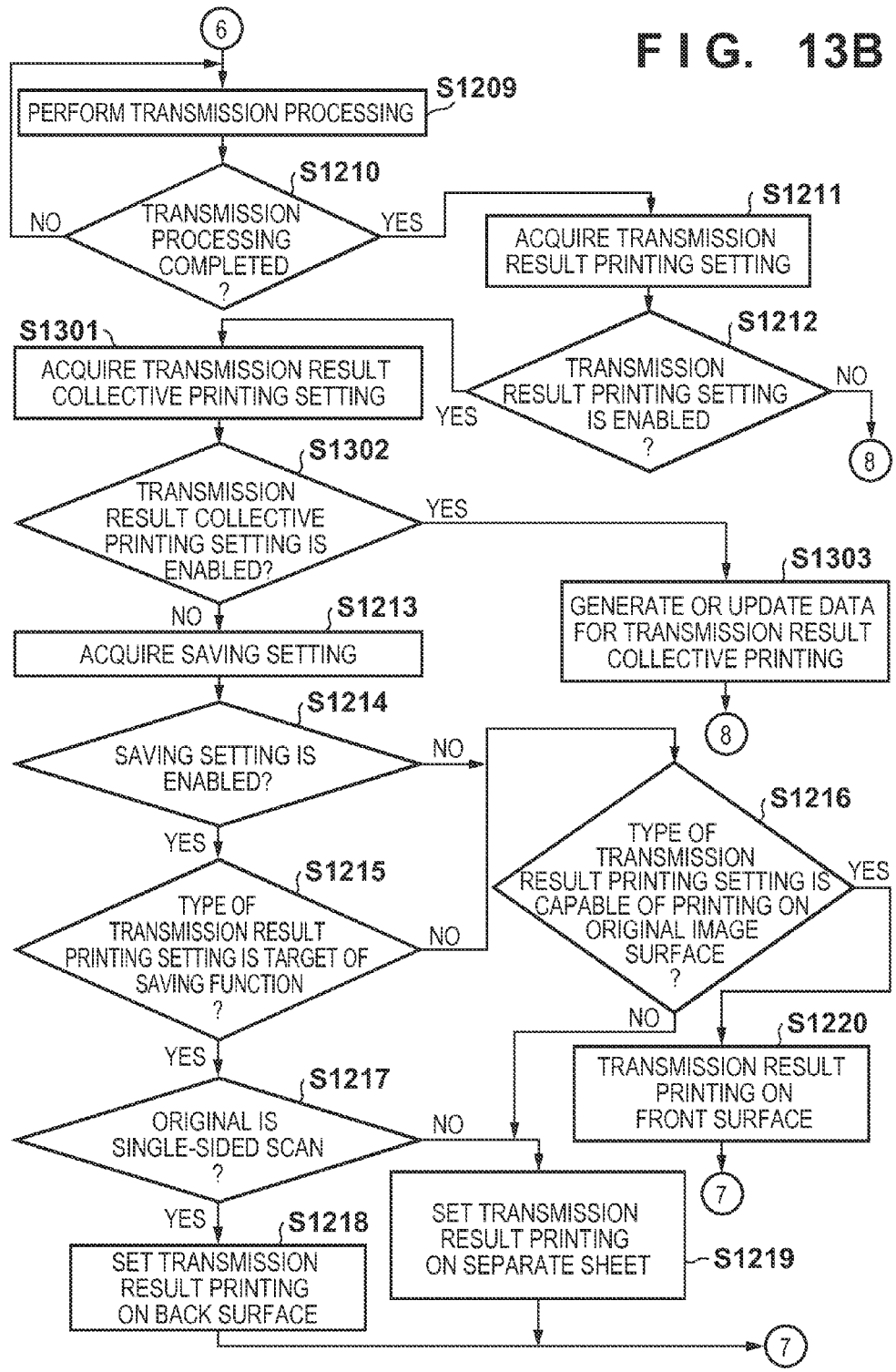
Figure 13C:
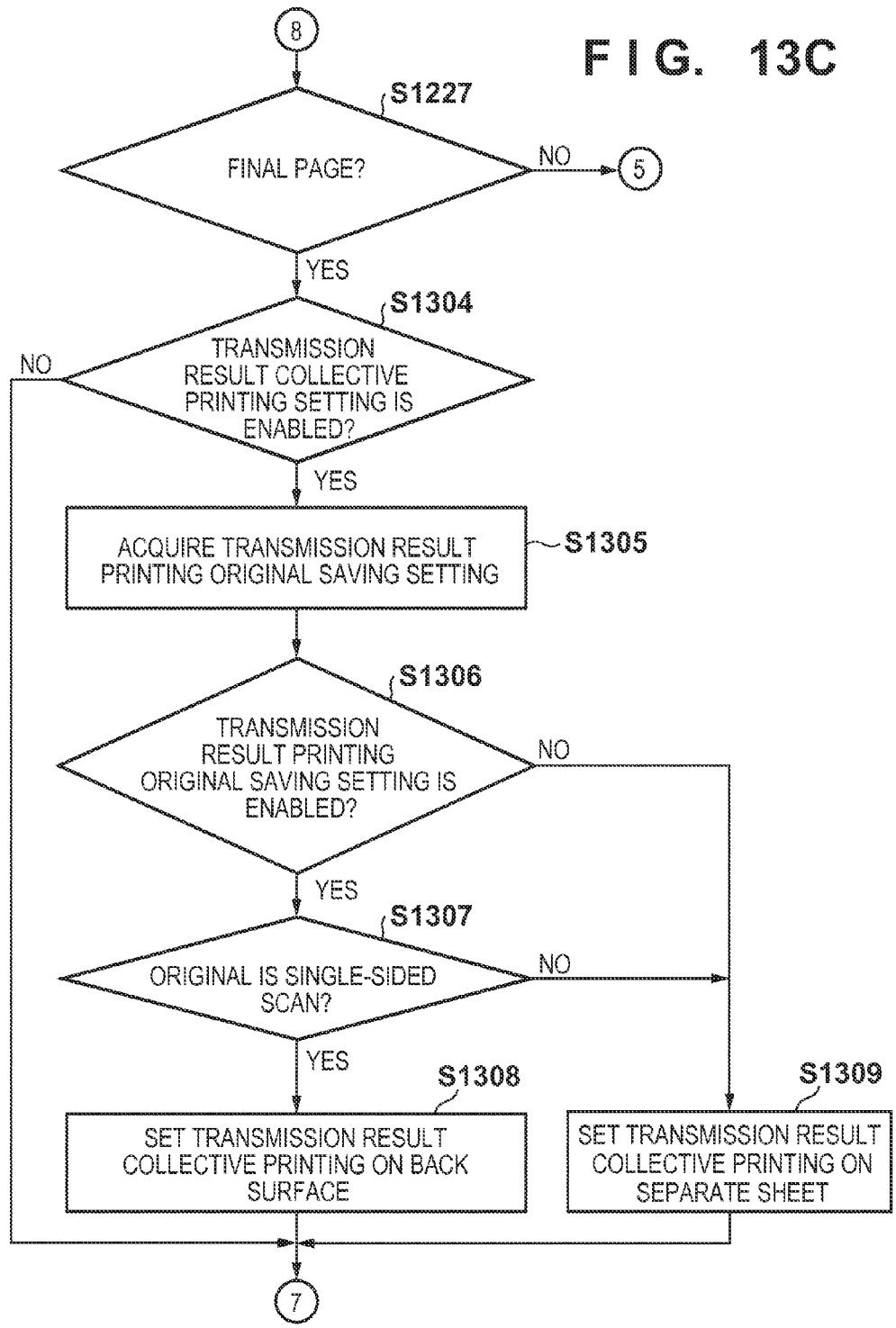
Figure 13D:
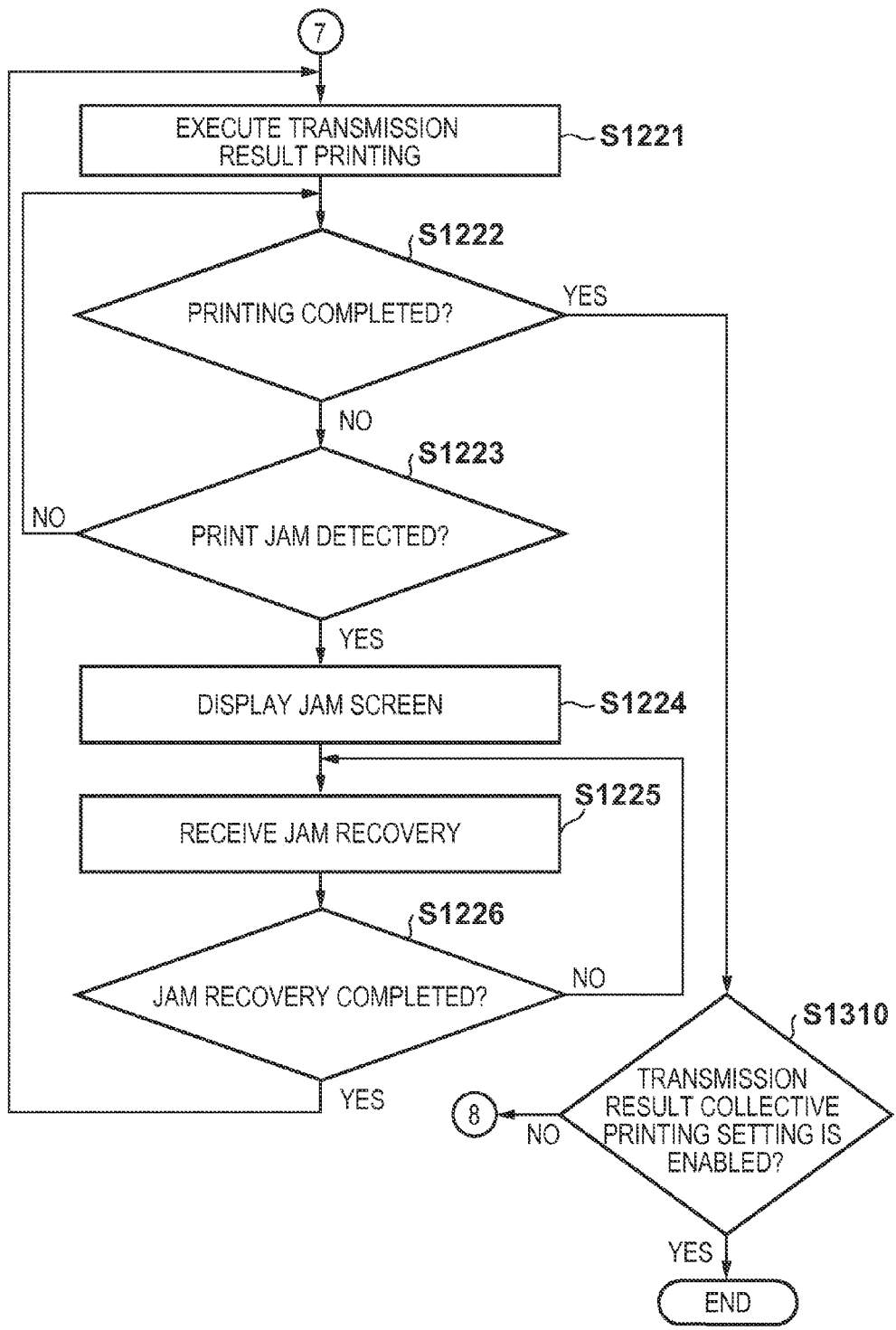
Figure 14B:
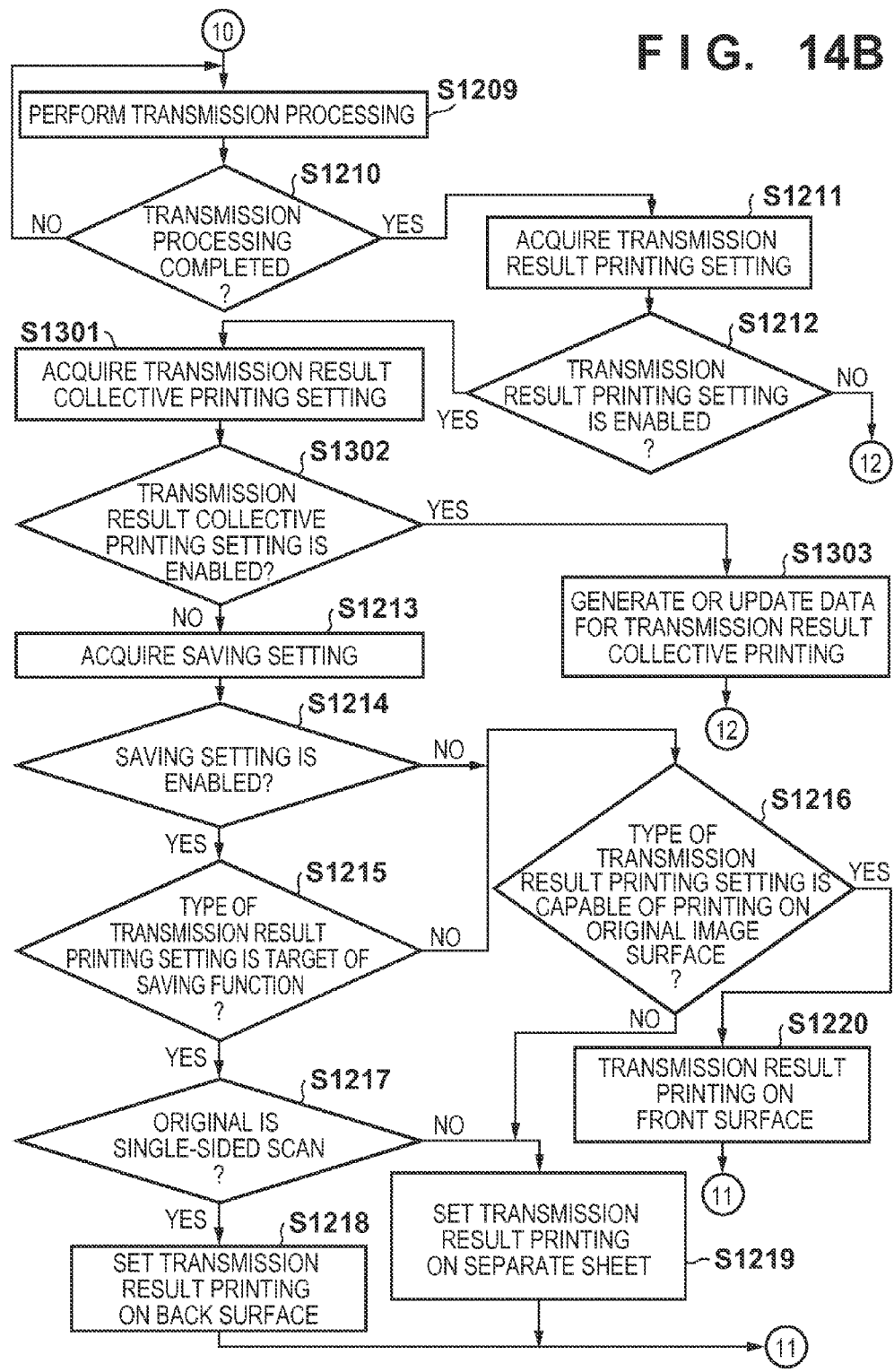
Figure 14C:
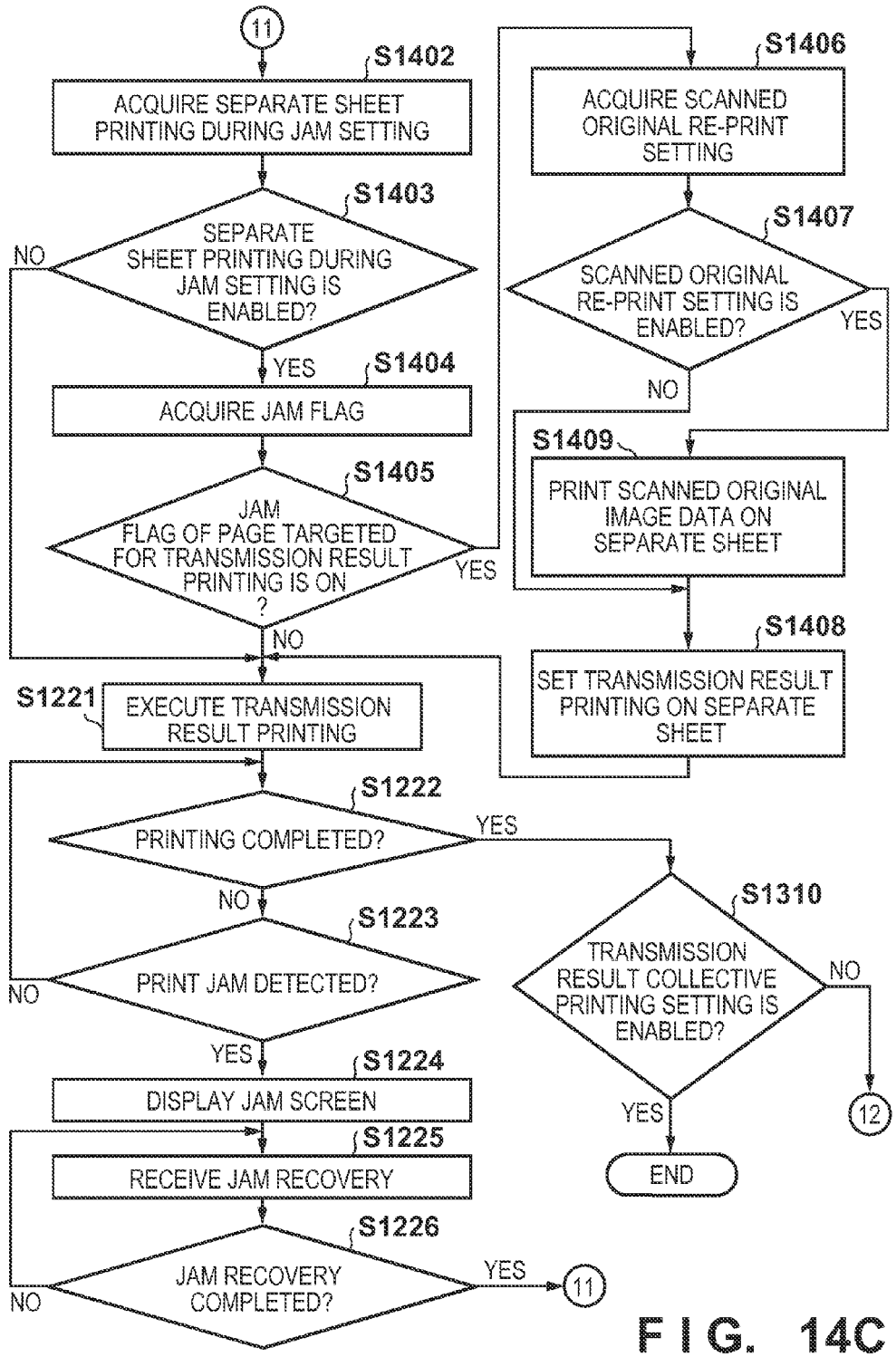
Figure 14D:
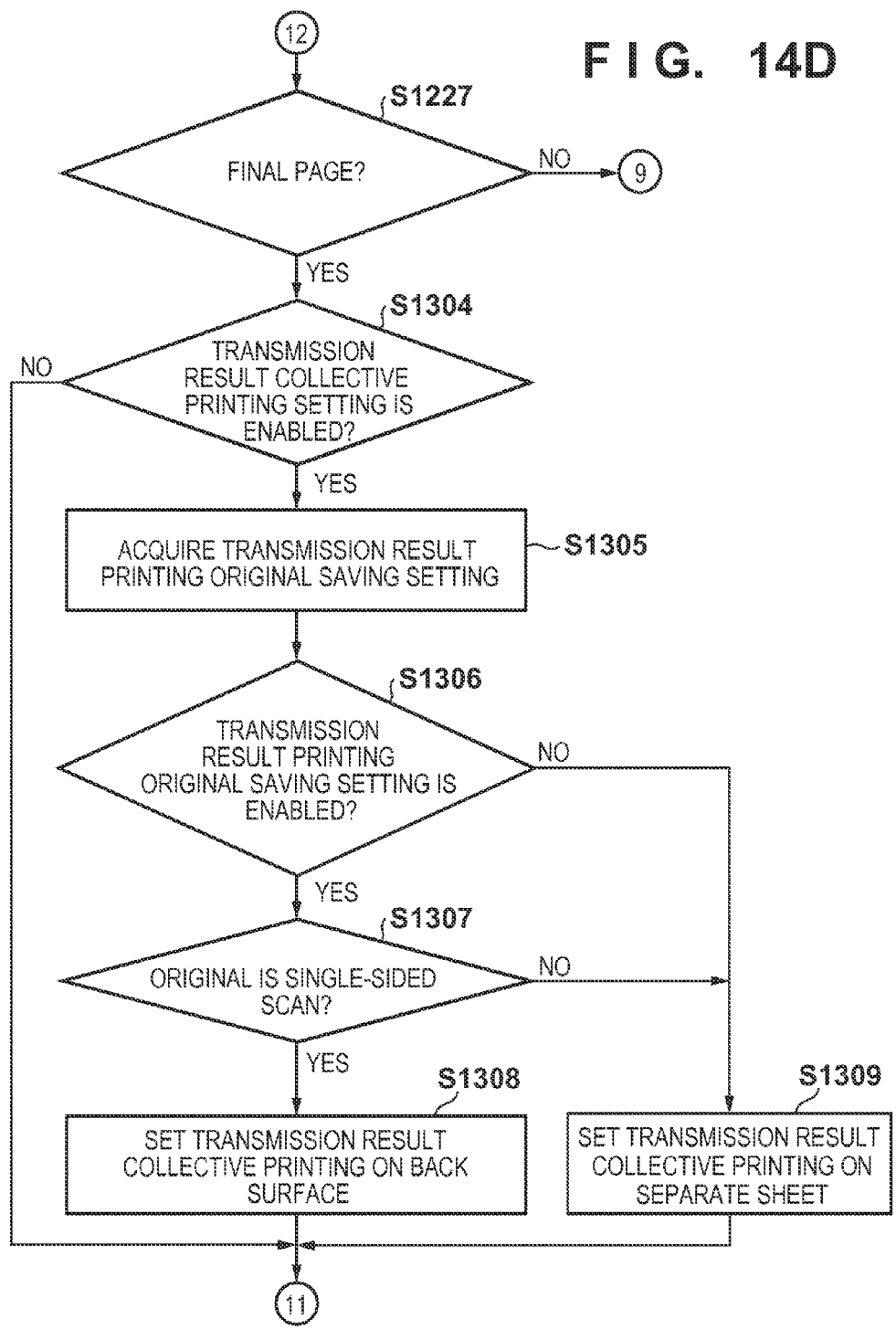

The following describes a second embodiment of the present invention with reference to FIGS. 10, 11, and 13. In the first embodiment, when transmission result printing is performed, regardless of the type of transmission result printing setting, transmission result printing is executed page-by-page for the originals that were scanned and subjected to transmission processing. However, in the case of performing transmission result printing with many items such as with the detailed report, if the original that is subjected to transmission processing includes multiple sheets, it is easier to understand the content of the previous page if the transmission results for all of the pages are grouped together in the transmission result printing instead of performing transmission result printing page-by-page. In view of this, the present embodiment describes control in the case where in addition to the processing of the image forming apparatus 1 of the first embodiment, transmission result printing is performed collectively on one page. In the present embodiment, the function in which transmission result printing for multiple pages is collectively performed on one page is called the transmission result collective printing function.

The control of the image forming apparatus 1 having the transmission result collective printing function in the present embodiment will be described in detail with reference to 10201 in FIG. 10B, 11004 in FIG. 11, and FIGS. 13A to 13D. Note that portions not described in the present embodiment, such as the configuration of the image forming apparatus 1, the original reading and transmission processing, and the transmission result printing processing, are the same as in the first embodiment.

Figure 10B:
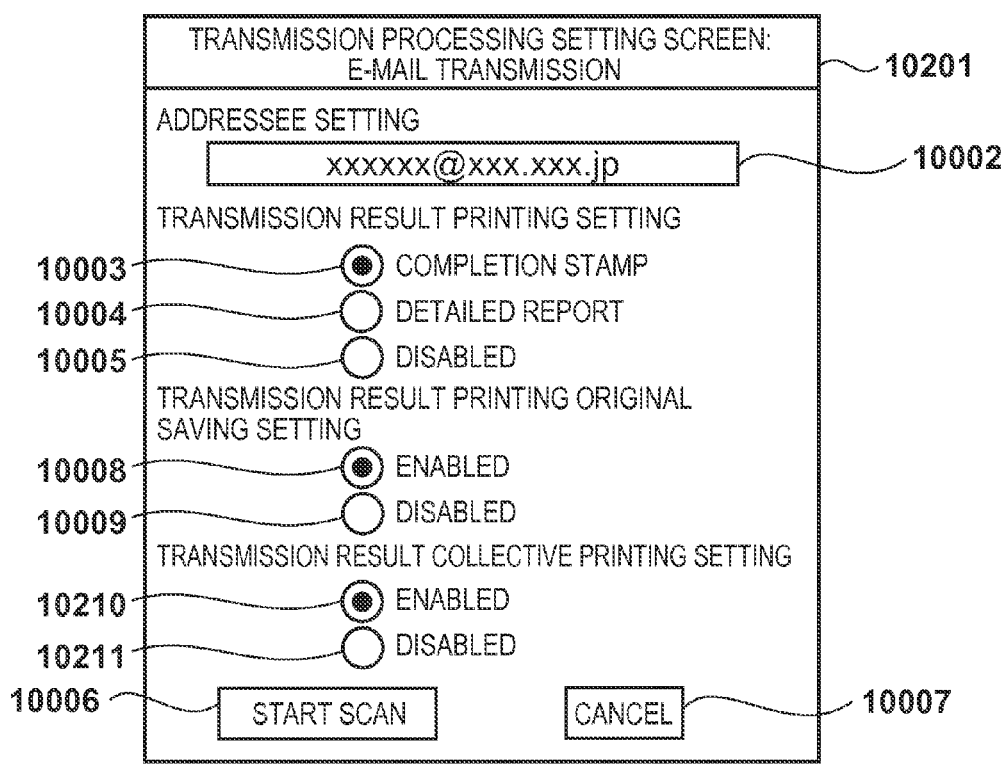

In FIG. 10B, 10201 indicates a transmission processing setting screen of the present embodiment for receiving input and settings from the operation unit 2000. The screen 10201 includes the configuration of the screen 10001 of the first embodiment, with the addition of an enable transmission result collective printing setting button 10210 and a disable transmission result collective printing setting button 10211 for respectively enabling and disabling the transmission result collective printing function. These settings are collectively called the transmission result collective printing setting in the present embodiment. This transmission result collective printing setting can only be set in the case where the detailed report setting is enabled as the transmission result printing setting. Similarly to the other settings, the setting value of the transmission result collective printing setting is also stored in and referenced from the SRAM 860 by the control unit 5.

Transmission Result Printing Control

The processing shown in FIGS. 13A to 13D of the present embodiment is the processing in FIGS. 12A to 12C of the first embodiment, with the addition of the processing from steps S1301 to S1310. Processing is added or modified due to the addition of the processing related to the transmission result collective printing function of the image forming apparatus 1. The other processing has been given the same reference numbers as in the flowchart of FIGS. 12A to 12C, and will not be described.

In step S1212, the control unit 5 determines whether or not the transmission result printing setting acquired from the SRAM 860 is enabled. If it is determined that the transmission result printing setting is enabled, the procedure moves to step S1301, in which the control unit 5 acquires the transmission result collective printing setting from the SRAM 860, and thereafter the procedure moves to step S1302. In step S1302, the control unit 5 determines whether or not the transmission result collective printing setting acquired from the SRAM 860 is enabled. Here, if the transmission result collective printing setting is disabled, the procedure moves to step S1213. On the other hand, if the transmission result collective printing setting is enabled, the procedure moves to step S1303, in which the control unit 5 generates or updates data for transmission result collective printing, and thereafter the procedure moves to step S1227.

In FIG. 11, 11004 indicates an all transmission results detailed report original printed according to the transmission result collective printing function. This original includes the content of 11003 in the first embodiment, with the addition of the transmitted page count item. The transmitted page count value is updated in the processing of step S1303 in the present embodiment.

After the processing of step S1303, in step S1227, the control unit 5 determines whether or not the scanned original is the final page. If it is determined that the scanned original is not the final page, the procedure returns to step S1202. On the other hand, if it is determined that the scanned original is the final page, the procedure moves to step S1304, in which the control unit 5 determines whether or not the transmission result collective printing setting acquired from the SRAM 860 is enabled. If the transmission result collective printing setting is disabled, the procedure moves to step S1221, in which the control unit 5 executes transmission result printing. In other words, transmission result printing is executed page-by-page as described in the first embodiment.

On the other hand, if the transmission result collective printing setting is enabled, the control unit 5 acquires the saving setting from the SRAM 860. Next, in step S1306, the control unit 5 determines whether or not the saving setting acquired from the SRAM 860 is enabled. If the saving setting acquired from the SRAM 860 is disabled, the procedure moves to step S1309, in which the control unit 5 sets the collective printing of transmission results in the form of a detailed report on a separate sheet from the first sheet feeding unit 30, and thereafter the procedure moves to step S1221. On the other hand, if the saving setting acquired from the SRAM 860 is enabled, the procedure moves to step S1307, in which the control unit 5 determines whether the scan setting is single-sided scanning.

If the scan setting is single-sided scanning, the procedure moves to step S1308, in which the control unit 5 sets the collective printing of transmission results in the form of a detailed report on the back surface of the scanned original, and thereafter the procedure moves to step S1221. If the scan setting is double-sided scanning instead of single-sided scanning, the procedure moves to step S1309, in which the control unit 5 sets the collective printing of transmission results in the form of a detailed report on a separate sheet from the first sheet feeding unit 30, and thereafter the procedure moves to step S1221. According to this processing, if the transmission result collective printing setting is enabled, transmission results can be collectively printed for all of the scanned originals rather than page-by-page. Furthermore, if the saving setting is enabled, transmission results can be collectively printed on the back surface of a scanned original, and it is possible to save print sheets.

In step S1222 after the execution of step S1221, the control unit 5 determines whether or not printing is complete. The procedure moves to step S1223 if printing is not complete, whereas if it is determined that printing is complete, the procedure moves to step S1310, in which the control unit 5 determines whether or not the transmission result collective printing setting acquired from the SRAM 860 is enabled. Here, if it is determined that the transmission result collective printing setting is disabled, the procedure moves to step S1227, and if it is determined that it is enabled, the transmission processing is ended.

As described above, the image forming apparatus 1 of the present embodiment controls whether or not transmission results for multiple pages are to be printed collectively in accordance with the transmission result collective printing setting. The above-described control obtains the effects of the first embodiment, as well as makes it possible for transmission results for multiple pages to be printed collectively while saving originals.

Third Embodiment

The following describes a third embodiment of the present invention with reference to FIGS. 10 and 13. In the first and second embodiments, when a jam is detected in scanning or printing, transmission result printing is performed on the jammed original after jam recovery. However, if the jammed original is folded, ripped, or the like, it is conceivable for transmission result printing to not be possible, or for printing to become misaligned. In this case, transmission result printing needs to be performed on a separate sheet. In view of this, in the present embodiment, control is provided for performing transmission result printing on a separate sheet if a jam occurred during original reading or during the formation of transmission results. Also, if there was originally a desire to perform transmission result printing on the back surface of the scanned original at this time, transmission result printing will be performed on a separate sheet due to the jam, and therefore the image of the scanned original and the image of the printed transmission results will be separated on two sheets. In view of this, in the present embodiment, in the case where transmission result printing is to be performed on a separate sheet when jamming occurred, control is further provided for printing the image of the scanned original on the front surface of the sheet on which the transmission results were printed.

In addition to the processing of the image forming apparatus 1 in the first and second embodiments, the present embodiment describes control in which, even in the case of the setting for performing transmission result printing on the scanned original, transmission result printing is executed on a separate sheet if a jam has been detected. In the present embodiment, the function for performing transmission result printing on a sheet different from the printing target in the case where a jam has been detected is called the separate sheet printing during jamming function. Furthermore, the present embodiment also describes control for printing the scanned image on the separate sheet subjected to transmission result printing when the separate sheet printing during jamming function is enabled. In the present embodiment, this function is called the scanned original re-print function (re-formation). Note that portions not described in the present embodiment, such as the configuration of the image forming apparatus 1, the original reading and transmission processing, and the transmission result printing processing, are the same as in the first and second embodiments.

Figure 10C:
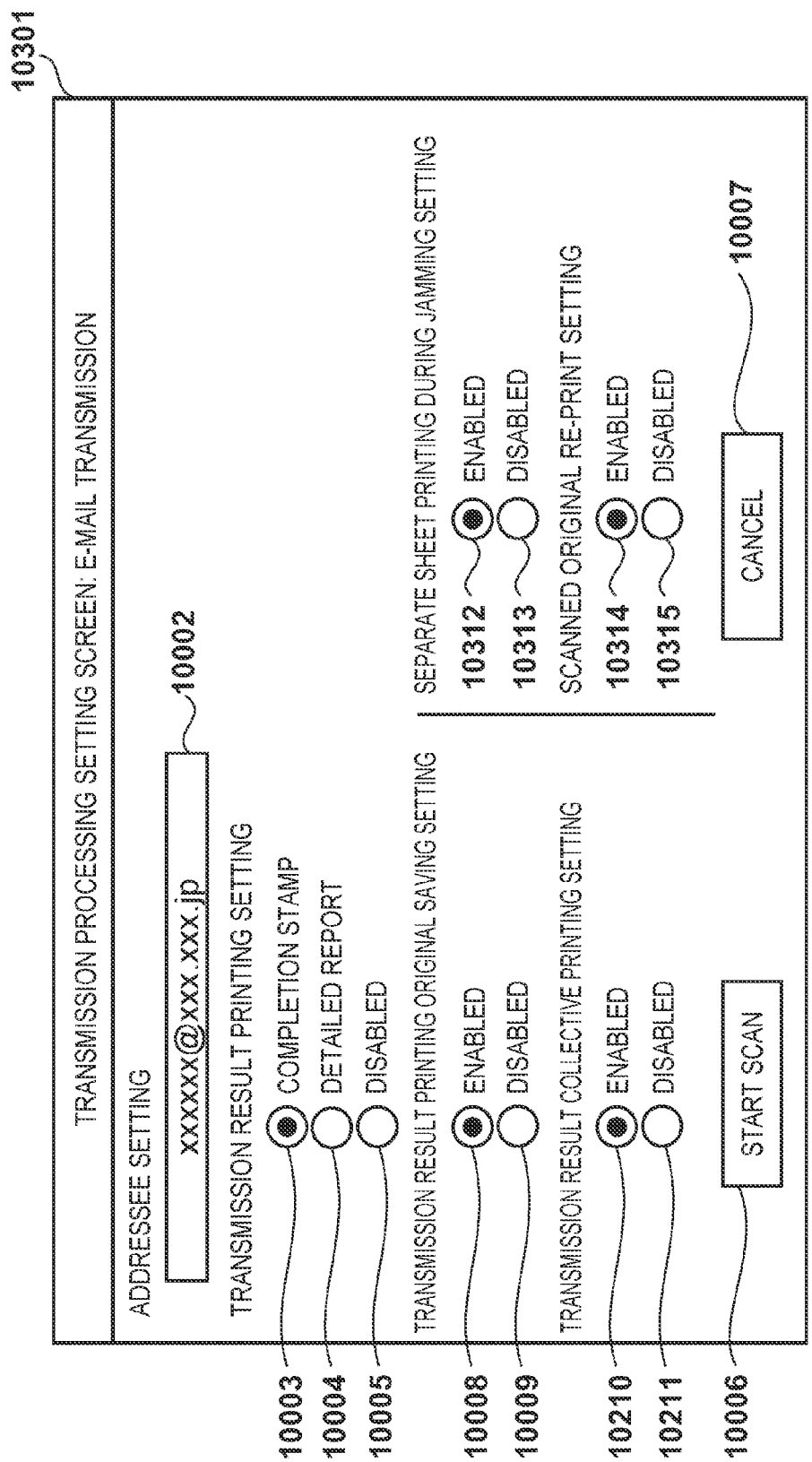

In FIG. 10C, 10301 indicates a transmission processing setting screen of the present embodiment for receiving input and settings from the operation unit 2000. The screen 10301 includes the content of the screen 10201 in the second embodiment, with the addition of an enable separate sheet printing during jamming setting button 10312 and a disable separate sheet printing during jamming setting button 10313 for respectively enabling and disabling the separate sheet printing during jamming function. These settings are collectively called the separate sheet printing during jamming setting in the present embodiment. This screen further includes the addition of an enable scanned original re-print button 10314 and a disable scanned original re-print button 10315 for respectively enabling and disabling the scanned original re-print function. These settings are collectively called the scanned original re-print setting in the present embodiment. The separate sheet printing during jamming setting and the scanned original re-print setting can be set only if the transmission result printing setting is enabled. Also, similarly to the other settings, the setting values of these settings are also stored in and referenced from the SRAM 860 by the control unit 5.

Transmission Result Printing Control

The processing in FIGS. 14A to 14D of the present embodiment is the processing of FIGS. 13A to 13D of the second embodiment, with the addition of the processing of steps S1401 to S1409. Processing is added or modified due to the addition of the processing related to the separate sheet printing during jamming function and the scanned original re-print function of the image forming apparatus 1, and this processing will be described in detail below. The other processing has been given the same reference numbers as in the flowchart of FIGS. 13A to 13B, and will not be described.

If it is determined in step S1207 that a jam recovery was received for the scan jam that occurred, the procedure moves to step S1401, in which the control unit 5 sets a jam flag to ON in the SRAM 860. This jam flag indicates whether or not a jam was detected for the scanning or printing target original, and holds information for each original surface. The region of the SRAM 860 for storing the jam flag is initialized before the start of a job. Thereafter, the procedure moves to step S1208. The processing from steps S1208 to S1220 will not be described since it is similar to the processing in the first and second embodiments.

After the processing of step S1220, the procedure moves to step S1402. In step S1402, the control unit 5 acquires the separate sheet printing during jamming setting from the SRAM 860. Next, in step S1403, the control unit 5 determines whether or not the separate sheet printing during jamming setting acquired from the SRAM 860 is enabled. If the separate sheet printing during jamming setting is disabled, the procedure moves to step S1221, in which the control unit 5 executes transmission result printing. Specifically, transmission result printing is executed page-by-page without giving consideration to jammed originals as described in the first and second embodiments.

On the other hand, if the separate sheet printing during jamming setting is enabled, the procedure moves to step S1404, in which the control unit 5 acquires the jam flag for the current page targeted for transmission result printing from the SRAM 860. Next, in step S1405, the control unit 5 determines whether or not the jam flag for the current page targeted for transmission result printing is enabled. Here, if the jam flag for the current page targeted for transmission result printing is disabled, the procedure moves to step S1221, in which the control unit 5 executes transmission result printing.

On the other hand, if the jam flag for the current page targeted for transmission result printing is enabled, the procedure moves to step S1406, in which the control unit 5 acquires the scanned original re-print setting from the SRAM 860. Next, in step S1407, the control unit 5 determines whether or not the scanned original re-print setting is enabled. Here, if it is determined that the scanned original re-print setting is disabled, the procedure moves to step S1408, in which the control unit 5 sets transmission result printing on a separate sheet, and thereafter the procedure moves to step S1221. According to this processing, transmission results can be printed on a separate sheet even if the jammed original is the target of transmission result printing. Furthermore, it is possible to prevent transmission result printing from becoming impossible or printing from becoming misaligned due to folding, ripping, or the like of the jammed original.

If it is determined in step S1407 that the scanned original re-print setting is enabled, the procedure moves to step S1409, in which the control unit 5 prints image data of the scanned original on a separate sheet. The procedure then moves to step S1408. Accordingly, even if transmission result printing will be performed on a separate original sheet due to a jam, it is possible to print the original image and the transmission result together on one original by printing the scanned image data.

As described above, according to the present embodiment, the image forming apparatus 1 having the saving function performs control for performing transmission result printing on a separate sheet when a jam has occurred, and control for printing the scanned original on the other sheet as well. According to the above-described control, it is possible to perform transmission result printing while saving originals, and also print transmission results on a fresh sheet when a jam has occurred.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-177241 filed on Aug. 28, 2013, which is hereby incorporated by reference herein in its entirety.

What is claimed is:

1. An image forming apparatus comprising:
   a reading unit configured to read an original to acquire image information;
   a processing unit configured to process the image information acquired by the reading unit;
   a determination unit configured to determine whether or not a processing result of the processing performed by the processing unit is to be formed on the original;
   a forming unit configured to form the processing result on the original if the determination unit has determined that the processing result is to be formed on the original, and to form the processing result on a sheet other than the original if the determination unit has determined that the processing result is not to be formed on the original; and
   a setting unit configured to set whether the processing result is to be formed in a simple form or is to be formed in a detailed form,
   wherein the determination unit determines that the processing result is to be formed on a front surface of the original if the setting unit sets that the processing result is to be formed in a simple form,
   the determination unit determines that the processing result is to be formed on a back surface of the original if the setting unit sets that the processing result is to be formed in a detailed form and furthermore the original has been subjected to single-sided printing, and
   the determination unit determines that the processing result is to be formed on a sheet other than the original if the setting unit sets that the processing result is to be formed in a detailed form and furthermore the original has been subjected to double-sided printing.

2. The image forming apparatus according to claim 1,
   wherein the setting unit further performs setting for reducing consumption of sheets on which the processing result is to be formed, and
   in a case where the setting unit has not set the reduction of consumption of sheets on which the processing result is to be formed, the determination unit always determines that the processing result is to be formed on a sheet other than the original even if the setting unit has set that the processing result is to be formed in a detailed form.

3. The image forming apparatus according to claim 1,
   wherein the setting unit further sets whether or not, in a case where a plurality of originals are read by the reading unit, processing results related to the plurality of originals are to be formed collectively, and
   in a case where the setting unit sets that processing results related to the plurality of originals are to be formed collectively and furthermore set that the processing results are to be formed in a detailed form, after reading of the final original by the reading unit has ended, the determination unit determines whether the final original has been subjected to single-sided printing or has been subjected to double-sided printing in order to determine whether the processing results are to be collectively formed on the back surface of the final original or are to be collectively formed on a sheet other than the plurality of originals.

4. The image forming apparatus according to claim 1, further comprising:
   a detection unit configured to detect whether or not a jam occurred in relation to a sheet or the original being conveyed, wherein the setting unit furthermore sets whether or not, in a case where the detection unit detected that a jam occurred in relation to a sheet or the original being conveyed during reading of the original or formation of the processing result, the processing result is to be formed on a sheet other than the sheet related to the jam, and in a case where the detection unit detected that a jam occurred, and furthermore the setting unit sets that the processing result is to be formed on a sheet other than the sheet related to the jam, the forming unit re-forms the processing result on a sheet other than the sheet related to the jam after the jam has been resolved.

5. The image forming apparatus according to claim 4, wherein the setting unit furthermore sets whether an image of the original is to be formed when re-forming the processing result on a sheet other than the sheet related to the jam after the jam has been resolved, and in a case where the setting unit set that the image of the original is to be formed, the forming unit forms the image of the original in addition to the processing result on a sheet other than the sheet related to the jam.

6. The image forming apparatus according to claim 1, wherein in a case of forming the processing result in a simple form, the forming unit forms a stamp indicating that processing is complete, and in a case of forming the processing result in a detailed form, the forming unit forms a detailed report of the processing result.

7. The image forming apparatus according to claim 1, further comprising:

a conveying unit configured to convey the original, wherein after an image of the original is read by the reading unit, in a case where the processing result is to be formed on the original, the conveying unit conveys the original to a position at which the forming unit performs image formation, and in a case where the processing result is to be formed on a sheet other than the original, the conveying unit discharges the original to the outside.

8. The image forming apparatus according to claim 7, wherein a conveying path for conveying the original to the reading unit and a double-sided conveying path are used in common, the double-sided conveying path being for, after the forming unit forms an image on a front surface of a sheet, inverting and conveying the sheet to the forming unit again for formation of an image on a back surface of the sheet.

9. The image forming apparatus according to claim 8, wherein the reading unit is movably arranged, and in a case where a first surface of the original is to be read, the reading unit moves to a position for reading an image of the original conveyed on the double-sided conveying path, and in a case where a second surface of the original that is a back surface of the first surface is to be read, the reading unit moves to a conveying path for discharging the original.

10. The image forming apparatus according to claim 1, wherein the processing unit is a transmission unit configured to transmit the image information read by the reading unit to an external apparatus.

11. A control method for an image forming apparatus, the control method comprising:

reading an original to acquire image information;

processing the image information acquired in the reading step;

determining whether or not a processing result of the processing performed in the processing step is to be formed on the original;

forming the processing result on the original if it was determined in the determining step that the processing result is to be formed on the original, and forming the processing result on a sheet other than the original if it was determined in the determining step that the processing result is not to be formed on the original; and setting whether the processing result is to be formed in a simple form or is to be formed in a detailed form, wherein it is determined that the processing result is to be formed on a front surface of the original if it is set that the processing result is to be formed in a simple form, it is determined that the processing result is to be formed on a back surface of the original if it is set that the processing result is to be formed in a detailed form and furthermore the original has been subjected to single-sided printing, and it is determined that the processing result is to be formed on a sheet other than the original if it is set that the processing result is to be formed in a detailed form and furthermore the original has been subjected to double-sided printing.

12. A non-transitory computer-readable storage medium storing a computer program for causing a computer to function as the image forming apparatus according to claim 1.

* * * * *